US011064518B2

(12) United States Patent
Chendamarai Kannan et al.

(10) Patent No.: US 11,064,518 B2
(45) Date of Patent: Jul. 13, 2021

(54) ASYNCHRONOUS SINGLE BEAM DIRECTIONAL LISTEN-BEFORE-TALK

(71) Applicant: QUALCOMM Incorporated, San Diego, CA (US)

(72) Inventors: Arumugam Chendamarai Kannan, San Diego, CA (US); Ahmed Kamel Sadek, San Diego, CA (US); Vinay Chande, San Diego, CA (US); Sanaz Barghi, Carlsbad, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/135,500

(22) Filed: Sep. 19, 2018

(65) Prior Publication Data
US 2019/0104542 A1 Apr. 4, 2019

Related U.S. Application Data

(60) Provisional application No. 62/566,068, filed on Sep. 29, 2017.

(51) Int. Cl.
*H04W 74/00* (2009.01)
*H04W 74/08* (2009.01)
(Continued)

(52) U.S. Cl.
CPC ........ *H04W 74/002* (2013.01); *H04B 7/0408* (2013.01); *H04B 7/0617* (2013.01);
(Continued)

(58) Field of Classification Search
CPC . H04B 7/0408; H04B 7/0617; H04W 74/002; H04W 72/046; H04W 74/006; H04W 74/0808; H04W 88/02
See application file for complete search history.

(56) References Cited

U.S. PATENT DOCUMENTS

2005/0254513 A1\* 11/2005 Cave .................... H04B 7/0408
370/445
2016/0302076 A1\* 10/2016 Chou .................... H04W 16/14
(Continued)

FOREIGN PATENT DOCUMENTS

WO WO-2016086144 A1 6/2016

OTHER PUBLICATIONS

"Random Access Preamble Design for 5G Millimeter-Wave Cellular Systems with Multiple Beams"; Arana et al.; Jul. 4, 2017. (Year: 2017).\*
(Continued)

*Primary Examiner* — Benjamin H Elliott, IV
(74) *Attorney, Agent, or Firm* — Liem T. Do

(57) ABSTRACT

Methods, systems, and devices for wireless communications are described. A base station may perform a channel access procedure on a shared radio frequency spectrum band using a first beam configuration. The base station may transmit, based at least in part on successful completion of the channel access procedure, a reservation request message (RRQ) to a user equipment (UE) using a second beam configuration, the second beam configuration comprising a beam width that is equal to or narrower than a beam width of the first beam configuration. The base station may receive a reservation response message (RRS) from the UE in response to the RRQ, the RRS comprising a third beam configuration that is based at least in part on the second beam configuration.

27 Claims, 21 Drawing Sheets

(51) Int. Cl.
H04B 7/0408 (2017.01)
H04B 7/06 (2006.01)
H04W 72/04 (2009.01)
H04W 88/02 (2009.01)

(52) U.S. Cl.
CPC ..... *H04W 72/046* (2013.01); *H04W 74/0808* (2013.01); *H04W 74/006* (2013.01); *H04W 88/02* (2013.01)

(56) References Cited

U.S. PATENT DOCUMENTS

| | | | | |
|---|---|---|---|---|
| 2018/0176949 | A1* | 6/2018 | Islam | H04W 52/146 |
| 2018/0235005 | A1* | 8/2018 | Ansari | H04W 74/0808 |
| 2018/0324716 | A1* | 11/2018 | Jeon | H04W 52/50 |
| 2018/0324853 | A1* | 11/2018 | Jeon | H04W 74/08 |
| 2019/0013883 | A1* | 1/2019 | Tercero Vargas | H04W 72/085 |
| 2019/0052334 | A1* | 2/2019 | Jeon | H04B 7/0626 |
| 2019/0053288 | A1* | 2/2019 | Zhou | H04W 74/006 |
| 2019/0104542 | A1* | 4/2019 | Chendamarai Kannan | H04W 72/046 |
| 2019/0373635 | A1* | 12/2019 | Yang | H04B 7/0408 |
| 2019/0387412 | A1* | 12/2019 | Kim | H04W 56/001 |

OTHER PUBLICATIONS

"Random Access Preamble Format for Systems with Many Antennas"; Sahlin et al.; Dec. 4, 2014. (Year: 2014).*
R1-1711279; "RACH configuration and procedure"; Motorola et al.; Jun. 27, 2017. (Year: 2017).*
R1-1711600; "PRACH preamble sequences and formats for capacity enhancement and beam management"; Huawei et al.; Jun. 27, 2017. (Year: 2017).*
R1-1711880; "LS on Beam Aspects of NR RACH"; Huawei; Jun. 27, 2017. (Year: 2017).*
AT&T: "Considerations on DL Tx Beam Reporting in Msg. 3", 3GPP Draft; R1-1707749 Considerations on DL TX Beam Reporting in MSG. 3, 3rd Generation Partnership Project (3GPP), Mobile Competence Centre; 650, Route Des Lucioles; F-06921 Sophia-Antipolis Cedex, vol. RAN WG1, No. Hangzhou, China; May 15, 2017-May 19, 2017, May 14, 2017 (May 14, 2017), 3 Pages, XP051272953, Retrieved from the Internet: URL: http://www.3gpp.org/ftp/Meetings_3GPP_SYNC/RAN1/Docs/ [retrieved on May 14, 2017].
Huawei, et al., "Beam Refinement During Random Access", 3GPP Draft; R2-1709261 Beam Refinement During Random Access, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), 2 Pages, XP051319025, Retrieved from the Internet: URL: http://www.3gpp.org/ftp/Meetings_3GPP_SYNC/RAN2/Docs/ [retrieved on Aug. 20, 2017].
Nokia, et al., "NR 4-Step RACH Procedure", 3GPP Draft; R1-1713342 NR 4-Step RACH Procedure, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017 (Aug. 20, 2017), pp. 1-7, XP051316146, Retrieved from the Internet: URL: http://www.3gpp.org/ftp/Meetings_3GPP_SYNC/RAN1/Docs/ [retrieved on Aug. 20, 2017].
Partial International Search Report—PCT/US2018/051926—ISA/EPO—dated Nov. 29, 2018.
Qualcomm, et al., "Beam Refinement in Msg2 and Beam Reporting in Msg3 during Multi-Beam Scenario", 3GPP Draft; R1-1706727, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Apr. 9, 2017 (Apr. 9, 2017), 4 Pages, XP051252939, Retrieved from the Internet: URL: http://www.3gpp.org/ftp/tsg_ran/WG1_RL1/TSGR1_88b/Docs/ [retrieved on Apr. 9, 2017].
Qualcomm Incorporated: "Measurement Reporting and Beam Refinement During RACH", 3GPP Draft; R2-1709088—Measurement Reporting and Beam Refinement During RACH, 3rd Generation Partnership Project (3GPP), Mobile Competence Centre; 650, Route Des Lucioles; F-06921 Sophia-Antipolis, vol. RAN WG2, No. Berlin, Germany; Aug. 21, 2017-Aug. 25, 2017, Aug. 20, 2017 (Aug. 20, 2017), pp. 1-6, XP051318880, Retrieved from the Internet: URL: http://www.3gpp.org/ftp/Meetings_3GPP_SYNC/RAN2/Docs/ [retrieved on Aug. 20, 2017].
International Search Report and Written Opinion—PCT/US2018/051926—ISA/EPO—dated Jan. 21, 2019.

* cited by examiner

ASYNCHRONOUS SINGLE BEAM DIRECTIONAL LISTEN-BEFORE-TALK

CROSS REFERENCES

The present Application for Patent claims the benefit of U.S. Provisional Patent Application No. 62/566,068 by CHENDAMARAI KANNAN, et al., entitled "ASYNCHRONOUS SINGLE BEAM DIRECTIONAL LISTEN-BEFORE-TALK," filed Sep. 29, 2017, assigned to the assignee hereof, and expressly incorporated by reference in its entirety.

BACKGROUND

The following relates generally to wireless communication, and more specifically to asynchronous single beam directional listen-before-talk (LBT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may operate in millimeter wave (mmW) frequency ranges (e.g., 28 GHz, 40 GHz, or 60 GHz) Wireless communications at these frequencies may be associated with increased signal attenuation (e.g., path loss), which may be influenced by various factors, such as temperature, barometric pressure, and diffraction. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

mmW wireless communications systems, while promising, present new challenges to old questions. Conventional considerations in developing wireless communications systems focus primarily on avoiding interference between communication devices, often at the expense of reuse. Thus, devices would elect to avoid transmitting out of concerns for interfering with neighboring devices, and the associated transmission opportunity would be wasted. Interference in a mmW wireless communications system, however, is different than in a non-mmW wireless communications system (e.g., such as within a conventional cell coverage area of a base station). For example, beamformed transmissions may have varying beam configurations such that each beam may have a different beam width or a different beam direction. Generally, a narrow beam width may have a relative deep, but narrow coverage area whereas a wider beam width may have a relative shallow, but wide coverage area. The "coverage area" (or footprint) within the context of a beamformed transmission may vary from one transmission to the next. Detecting the presence (e.g., for interference detection/avoidance, capturing the medium, and the like) of a narrow beam width may be difficult for a device to the left or right of the narrow beam coverage area. Similarly, detecting the presence of a wider beam may be difficult for a device just outside of the wide, but shallow coverage area. Thus, the directionality and configuration of transmit and receive beams provide a certain level of interference isolation in a mmW wireless communications systems. Conventional interference detection/medium access techniques would likely fail in such circumstances.

SUMMARY

Generally, the described techniques provide for an efficient mechanism for improving channel access in a millimeter wave (mmW) wireless communications system. In some aspects, the described techniques provide for improved channel access techniques in a mmW wireless communications system with a focus on robustness with minimal reuse loss. For example, a base station may be configured to use a beam configuration-based protocol for a listen-before-talk (LBT) procedure in a mmW network to capture the medium. In some aspects, the base station may use a beam configuration during a channel access procedure. The beam configuration may include the use of a beamformed transmission having a certain beam width. The beam configuration may be referred to as beam "X." If the channel access procedure is successful and the medium is available, the base station may transmit a reservation request message (RRQ) to a user equipment (UE). The RRQ message may be transmitted using the same beam configuration (e.g., beam X) or a beam configuration having a narrower beam (e.g., a beam corresponding to a higher antenna gain than the antenna gain corresponding to the beam configuration associated with the RRQ message) width (e.g., beam X'). The base station may receive a reservation response message (RRS) from the UE in response to the RRQ. The RRS may be received on a beam configuration based on the beam configuration used to transmit the RRQ (e.g., beam X').

In some aspects, the base station may additionally or alternatively transmit the data communications to the UE based on an energy detection LBT procedure. For example, the base station may perform a series of energy based LBT procedures (e.g., over multiple slots or symbols) to detect energy levels on the channel. If the energy based LBT procedure is successful, the base station may determine a beam configuration to use for the data communications with the UE. The base station may use the beam configuration for the data communications.

In some aspects, the base station may additionally or alternatively transmit a medium sensing trigger to a UE before scheduling the UE for communications. For example, the base station may determine that data is available to communicate to the UE and transmit an indication of a time period that the UE is to monitor the channel for reservation signaling (e.g., an RRQ, an RRS, a preamble message, and the like). The UE may receive the indication of the time period and monitor the channel for the reservation signaling during the time period. The base station may transmit (and the UE may receive) the reservation signaling on the channel during the indicated time period.

In some aspects, the base station may additionally or alternatively transmit an additional RRS message in an uplink scenario. For example, the base station may perform the channel access procedure using the beam configuration (e.g., beam X) and transmit the RRQ message to the UE when the channel access procedure is successful. The base station may then transmit an RRS message to the UE (e.g., without expecting a response signal from the UE) after the RRQ to confirm the uplink resources are allocated for the uplink data communications.

In some aspects, a UE may additionally or alternatively sense the medium on the channel using the beam configuration associated with the beam configuration used for the data communication. For example, the UE may receive the RRQ and respond with an RRS, as discussed above. The UE may then identify a beam configuration based on an interframe spacing (IFS) between a downlink and uplink portions of the transmission opportunity and perform a channel access procedure using the beam configuration.

A method of wireless communication is described. The method may include performing a channel access procedure on a shared radio frequency spectrum band using a first beam configuration, transmitting, based at least in part on successful completion of the channel access procedure, a RRQ to a UE using a second beam configuration, the second beam configuration comprising a beam width that is equal to or narrower than a beam width of the first beam configuration, and receiving a RRS from the UE in response to the RRQ, the RRS comprising a third beam configuration that is based at least in part on the second beam configuration.

An apparatus for wireless communication is described. The apparatus may include means for performing a channel access procedure on a shared radio frequency spectrum band using a first beam configuration, means for transmitting, based at least in part on successful completion of the channel access procedure, an RRQ to a UE using a second beam configuration, the second beam configuration comprising a beam width that is equal to or narrower than a beam width of the first beam configuration, and means for receiving an RRS from the UE in response to the RRQ, the RRS comprising a third beam configuration that is based at least in part on the second beam configuration.

Another apparatus for wireless communication is described. The apparatus may include a processor, memory in electronic communication with the processor, and instructions stored in the memory. The instructions may be operable to cause the processor to perform a channel access procedure on a shared radio frequency spectrum band using a first beam configuration, transmit, based at least in part on successful completion of the channel access procedure, an RRQ to a UE using a second beam configuration, the second beam configuration comprising a beam width that is equal to or narrower than a beam width of the first beam configuration, and receive an RRS from the UE in response to the RRQ, the RRS comprising a third beam configuration that is based at least in part on the second beam configuration.

A non-transitory computer-readable medium for wireless communication is described. The non-transitory computer-readable medium may include instructions operable to cause a processor to perform a channel access procedure on a shared radio frequency spectrum band using a first beam configuration, transmit, based at least in part on successful completion of the channel access procedure, an RRQ to a UE using a second beam configuration, the second beam configuration comprising a beam width that is equal to or narrower than a beam width of the first beam configuration, and receive an RRS from the UE in response to the RRQ, the RRS comprising a third beam configuration that is based at least in part on the second beam configuration.

Some examples of the method, apparatus, and non-transitory computer-readable medium described above may further include processes, features, means, or instructions for transmitting a preamble message in response to the RRS using the second beam configuration. Some examples of the method, apparatus, and non-transitory computer-readable medium described above may further include processes, features, means, or instructions for transmitting a control signal indicating one or more resources to be used for data communications. Some examples of the method, apparatus, and non-transitory computer-readable medium described above may further include processes, features, means, or instructions for transmitting a data communication using the one or more resources.

Some examples of the method, apparatus, and non-transitory computer-readable medium described above may further include processes, features, means, or instructions for determining that downlink data may be available for a plurality of UEs. Some examples of the method, apparatus, and non-transitory computer-readable medium described above may further include processes, features, means, or instructions for performing, based at least in part on the determination, a sequence of channel access procedures over a plurality of corresponding beam directions using the first beam configuration.

Some examples of the method, apparatus, and non-transitory computer-readable medium described above may further include processes, features, means, or instructions for performing the sequence of channel access procedures comprises, for beam direction: detecting an energy level in each direction over a predetermined number of contention slots, or monitoring for RRSs over the predetermined number of contention slots.

Some examples of the method, apparatus, and non-transitory computer-readable medium described above may further include processes, features, means, or instructions for selecting a first beam width for the first beam configuration. Some examples of the method, apparatus, and non-transitory computer-readable medium described above may further include processes, features, means, or instructions for selecting a second beam width for the second beam configuration, the second beam width being narrower than the first beam width.

Some examples of the method, apparatus, and non-transitory computer-readable medium described above may further include processes, features, means, or instructions for selecting an energy or preamble detection threshold for the channel access procedure based at least in part on a width of the first beam width.

Some examples of the method, apparatus, and non-transitory computer-readable medium described above may further include processes, features, means, or instructions for selecting an energy or preamble detection threshold for the channel access procedure based at least in part on a difference between the first beam width and the second beam width.

Some examples of the method, apparatus, and non-transitory computer-readable medium described above may further include processes, features, means, or instructions for selecting an energy or preamble detection threshold for the channel access procedure based at least in part on whether the first beam width comprises a P1 beam, a P2 beam, or a P3 beam.

Some examples of the method, apparatus, and non-transitory computer-readable medium described above may further include processes, features, means, or instructions for selecting a first beam width for the first beam configuration and the second beam configuration.

Some examples of the method, apparatus, and non-transitory computer-readable medium described above may further include processes, features, means, or instructions for configuring each UE of a plurality of UEs for which downlink data may be available with orthogonal resources for receiving the corresponding RRSs.

Some examples of the method, apparatus, and non-transitory computer-readable medium described above may further include processes, features, means, or instructions for configuring each UE of a plurality of UEs for which downlink data may be available with overlapping resources for receiving the corresponding RRSs. Some examples of the method, apparatus, and non-transitory computer-readable medium described above may further include processes, features, means, or instructions for determining an energy or preamble detection threshold for detecting each corresponding RRS based at least in part on the third beam configuration.

In some examples of the method, apparatus, and non-transitory computer-readable medium described above, determining that the channel access procedure may be successful comprises: determining that no RRQ or RRS may be received from other devices during the channel access procedure.

In some examples of the method, apparatus, and non-transitory computer-readable medium described above, determining that the channel access procedure may be successful comprises: determining that no active RRQ or RRS may be received from other devices during the channel access procedure, wherein an active RRQ or RRS comprises detecting a corresponding preamble message transmitted in response to the RRQ or RRS.

Some examples of the method, apparatus, and non-transitory computer-readable medium described above may further include processes, features, means, or instructions for determining that an active RRQ or active RRS may be received from other devices during the channel access procedure, wherein an active RRQ or active RRS comprises detecting a corresponding preamble message transmitted in response to the RRQ or RRS and within a fixed time period. Some examples of the method, apparatus, and non-transitory computer-readable medium described above may further include processes, features, means, or instructions for performing a backoff procedure based at least in part on one or more of the active RRQ, the active RRS, an RRQ or RRS of a second operator, or an RRQ or RRS of the first operator.

Some examples of the method, apparatus, and non-transitory computer-readable medium described above may further include processes, features, means, or instructions for configuring a preamble message in response to the RRS using the second beam configuration, wherein the preamble message confirms a reservation for uplink communications from the UE.

In some examples of the method, apparatus, and non-transitory computer-readable medium described above, the channel access procedure comprises at least one of an energy-based LBT procedure or a preamble-based LBT procedure.

A method of wireless communication is described. The method may include performing a sequential energy detection-based LBT channel access procedure on a shared radio frequency spectrum band using a plurality of beam configurations, determining, based at least in part on successful completion of the channel access procedure for a first beam configuration of the plurality of beam configurations, that the shared radio frequency spectrum band is available for data communications using the first beam configuration, and transmitting the data communications on the shared radio frequency spectrum band using the first beam configuration.

An apparatus for wireless communication is described. The apparatus may include means for performing a sequential energy detection-based LBT channel access procedure on a shared radio frequency spectrum band using a plurality of beam configurations, means for determining, based at least in part on successful completion of the channel access procedure for a first beam configuration of the plurality of beam configurations, that the shared radio frequency spectrum band is available for data communications using the first beam configuration, and means for transmitting the data communications on the shared radio frequency spectrum band using the first beam configuration.

Another apparatus for wireless communication is described. The apparatus may include a processor, memory in electronic communication with the processor, and instructions stored in the memory. The instructions may be operable to cause the processor to perform a sequential energy detection-based LBT channel access procedure on a shared radio frequency spectrum band using a plurality of beam configurations, determine, based at least in part on successful completion of the channel access procedure for a first beam configuration of the plurality of beam configurations, that the shared radio frequency spectrum band is available for data communications using the first beam configuration, and transmit the data communications on the shared radio frequency spectrum band using the first beam configuration.

A non-transitory computer-readable medium for wireless communication is described. The non-transitory computer-readable medium may include instructions operable to cause a processor to perform a sequential energy detection-based LBT channel access procedure on a shared radio frequency spectrum band using a plurality of beam configurations, determine, based at least in part on successful completion of the channel access procedure for a first beam configuration of the plurality of beam configurations, that the shared radio frequency spectrum band is available for data communications using the first beam configuration, and transmit the data communications on the shared radio frequency spectrum band using the first beam configuration.

A method of wireless communication is described. The method may include determining that downlink data is pending for a UE, transmitting, based at least in part on the determining, an indication of a time period during which the UE is to monitor a shared radio frequency spectrum band for one or more of a reservation request message, a reservation response message, or a preamble message from the base station, performing a channel access procedure with the UE, and transmitting, based at least in part on the channel access procedure, the reservation message to the UE within the predefined time period.

An apparatus for wireless communication is described. The apparatus may include means for determining that downlink data is pending for a UE, means for transmitting, based at least in part on the determining, an indication of a time period during which the UE is to monitor a shared radio frequency spectrum band for one or more of a reservation request message, a reservation response message, or a preamble message from the base station, means for performing a channel access procedure with the UE, and means for transmitting, based at least in part on the channel access procedure, the reservation message to the UE within the predefined time period.

Another apparatus for wireless communication is described. The apparatus may include a processor, memory in electronic communication with the processor, and instructions stored in the memory. The instructions may be operable to cause the processor to determine that downlink data is pending for a UE, transmit, based at least in part on the determining, an indication of a time period during which the UE is to monitor a shared radio frequency spectrum band for one or more of a reservation request message, a reservation response message, or a preamble message from the base station, perform a channel access procedure with the UE, and transmit, based at least in part on the channel access procedure, the reservation message to the UE within the predefined time period.

A non-transitory computer-readable medium for wireless communication is described. The non-transitory computer-readable medium may include instructions operable to cause a processor to determine that downlink data is pending for a UE, transmit, based at least in part on the determining, an indication of a time period during which the UE is to monitor a shared radio frequency spectrum band for one or more of a reservation request message, a reservation response message, or a preamble message from the base station, perform a channel access procedure with the UE, and transmit, based at least in part on the channel access procedure, the reservation message to the UE within the predefined time period.

A method of wireless communication is described. The method may include receiving, from a base station, an indication of a time period during which UE is to monitor a shared radio frequency spectrum band for one or more of a reservation request message, a reservation response message, or a preamble message from the base station, monitoring the shared radio frequency spectrum band during the time period to receive at least one of the reservation request message, the reservation response message, or the preamble message from the base station, and receiving downlink data from the base station based at least in part on the received reservation request message, reservation response message, or preamble message from the base station.

An apparatus for wireless communication is described. The apparatus may include means for receiving, from a base station, an indication of a time period during which UE is to monitor a shared radio frequency spectrum band for one or more of a reservation request message, a reservation response message, or a preamble message from the base station, means for monitoring the shared radio frequency spectrum band during the time period to receive at least one of the reservation request message, the reservation response message, or the preamble message from the base station, and means for receiving downlink data from the base station based at least in part on the received reservation request message, reservation response message, or preamble message from the base station.

Another apparatus for wireless communication is described. The apparatus may include a processor, memory in electronic communication with the processor, and instructions stored in the memory. The instructions may be operable to cause the processor to receive, from a base station, an indication of a time period during which UE is to monitor a shared radio frequency spectrum band for one or more of a reservation request message, a reservation response message, or a preamble message from the base station, monitor the shared radio frequency spectrum band during the time period to receive at least one of the reservation request message, the reservation response message, or the preamble message from the base station, and receive downlink data from the base station based at least in part on the received reservation request message, reservation response message, or preamble message from the base station.

A non-transitory computer-readable medium for wireless communication is described. The non-transitory computer-readable medium may include instructions operable to cause a processor to receive, from a base station, an indication of a time period during which UE is to monitor a shared radio frequency spectrum band for one or more of a reservation request message, a reservation response message, or a preamble message from the base station, monitor the shared radio frequency spectrum band during the time period to receive at least one of the reservation request message, the reservation response message, or the preamble message from the base station, and receive downlink data from the base station based at least in part on the received reservation request message, reservation response message, or preamble message from the base station.

Some examples of the method, apparatus, and non-transitory computer-readable medium described above may further include processes, features, means, or instructions for selecting an energy or preamble detection threshold for the monitoring based at least in part on a non-continuous monitoring configuration of the UE.

A method of wireless communication is described. The method may include performing a channel access procedure on a shared radio frequency spectrum band using a first beam configuration, transmitting, based at least in part on successful completion of the channel access procedure, an RRQ to a UE using a second beam configuration, the second beam configuration comprising a beam width that is equal to or narrower than a beam width of the first beam configuration, and transmitting an RRS to the UE in response to the RRQ, the RRS comprising a third beam configuration that is based at least in part on the second beam configuration.

An apparatus for wireless communication is described. The apparatus may include means for performing a channel access procedure on a shared radio frequency spectrum band using a first beam configuration, means for transmitting, based at least in part on successful completion of the channel access procedure, an RRQ to a UE using a second beam configuration, the second beam configuration comprising a beam width that is equal to or narrower than a beam width of the first beam configuration, and means for transmitting an RRS to the UE in response to the RRQ, the RRS comprising a third beam configuration that is based at least in part on the second beam configuration.

Another apparatus for wireless communication is described. The apparatus may include a processor, memory in electronic communication with the processor, and instructions stored in the memory. The instructions may be operable to cause the processor to perform a channel access procedure on a shared radio frequency spectrum band using a first beam configuration, transmit, based at least in part on successful completion of the channel access procedure, an RRQ to a UE using a second beam configuration, the second beam configuration comprising a beam width that is equal to or narrower than a beam width of the first beam configuration, and transmit an RRS to the UE in response to the RRQ, the RRS comprising a third beam configuration that is based at least in part on the second beam configuration.

A non-transitory computer-readable medium for wireless communication is described. The non-transitory computer-readable medium may include instructions operable to cause a processor to perform a channel access procedure on a shared radio frequency spectrum band using a first beam configuration, transmit, based at least in part on successful completion of the channel access procedure, an RRQ to a UE using a second beam configuration, the second beam configuration comprising a beam width that is equal to or narrower than a beam width of the first beam configuration, and transmit an RRS to the UE in response to the RRQ, the RRS comprising a third beam configuration that is based at least in part on the second beam configuration.

Some examples of the method, apparatus, and non-transitory computer-readable medium described above may further include processes, features, means, or instructions for transmitting a control signal indicating one or more resources to be used for data communications. Some examples of the method, apparatus, and non-transitory computer-readable medium described above may further include processes, features, means, or instructions for transmitting a data communication using the one or more resources.

A method of wireless communication is described. The method may include receiving an RRQ for a transmission opportunity from a base station over a shared radio frequency spectrum band, transmitting an RRS to the base station over the shared radio frequency spectrum band in response to the RRQ, identifying a beam configuration based at least in part on an inter-frame spacing between a downlink portion of the transmission opportunity and an uplink opportunity of the transmission opportunity, and performing a channel access procedure using the second beam configuration.

An apparatus for wireless communication is described. The apparatus may include means for receiving an RRQ for a transmission opportunity from a base station over a shared radio frequency spectrum band, means for transmitting an RRS to the base station over the shared radio frequency spectrum band in response to the RRQ, means for identifying a beam configuration based at least in part on an inter-frame spacing between a downlink portion of the transmission opportunity and an uplink opportunity of the transmission opportunity, and means for performing a channel access procedure using the second beam configuration.

Another apparatus for wireless communication is described. The apparatus may include a processor, memory in electronic communication with the processor, and instructions stored in the memory. The instructions may be operable to cause the processor to receive an RRQ for a transmission opportunity from a base station over a shared radio frequency spectrum band, transmit an RRS to the base station over the shared radio frequency spectrum band in response to the RRQ, identify a beam configuration based at least in part on an inter-frame spacing between a downlink portion of the transmission opportunity and an uplink opportunity of the transmission opportunity, and perform a channel access procedure using the second beam configuration.

A non-transitory computer-readable medium for wireless communication is described. The non-transitory computer-readable medium may include instructions operable to cause a processor to receive an RRQ for a transmission opportunity from a base station over a shared radio frequency spectrum band, transmit an RRS to the base station over the shared radio frequency spectrum band in response to the RRQ, identify a beam configuration based at least in part on an inter-frame spacing between a downlink portion of the transmission opportunity and an uplink opportunity of the transmission opportunity, and perform a channel access procedure using the second beam configuration.

DETAILED DESCRIPTION

Figure 1:
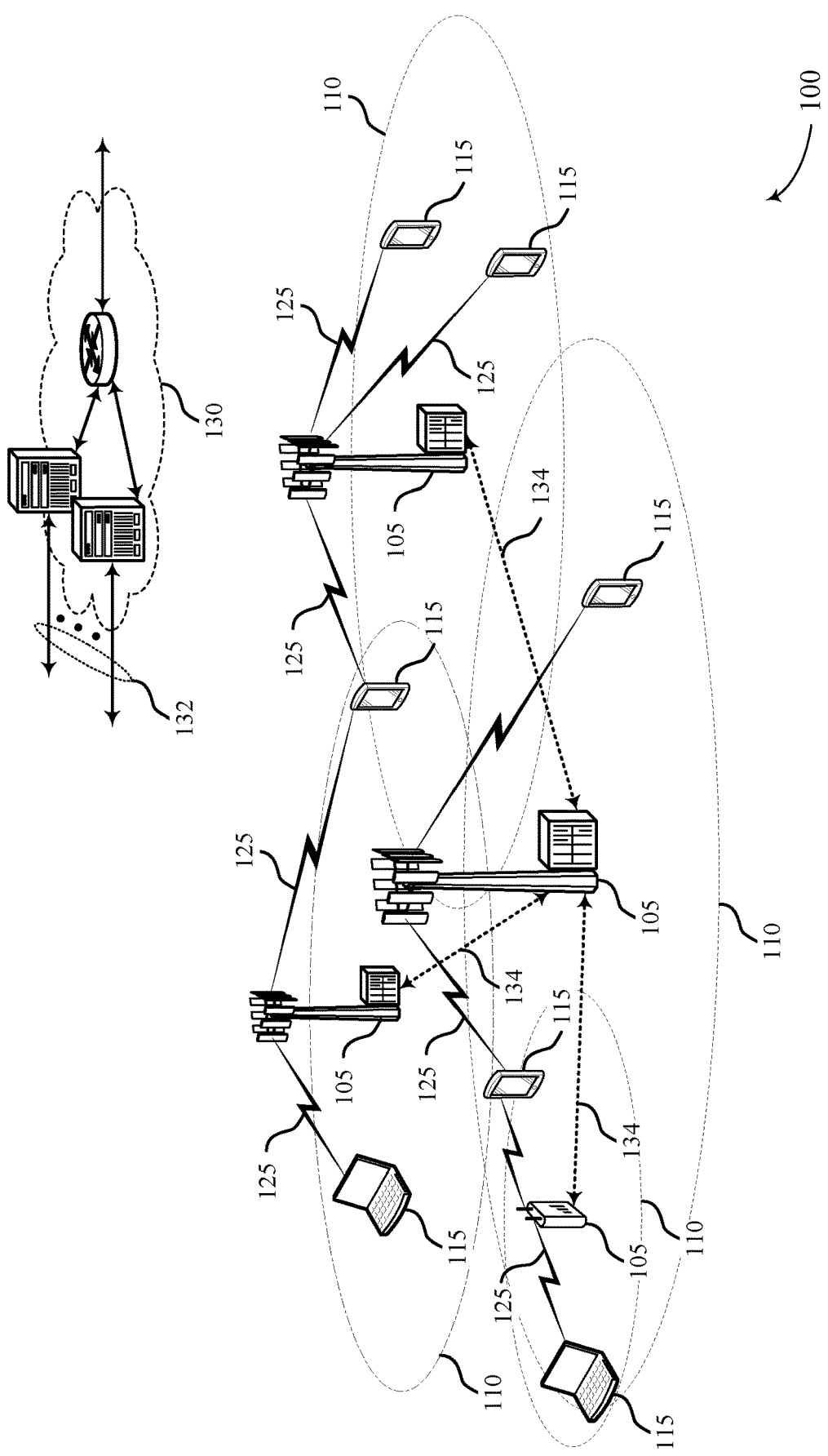
FIG. 1 illustrates an example of a wireless communications system that supports asynchronous single beam directional listen-before-talk (LBT) in accordance with aspects of the present disclosure.

Next generation wireless communications systems may rely on millimeter wave (mmW) communication technologies. mmW technologies typically use beamformed transmissions/receptions to provide directional communications. Each beamformed transmission/reception may have an associated beam configuration, such as a beam width, a beamforming configuration, and the like. A transmit beam may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like).

mmW wireless communications systems present unique challenges with respect to interference management, medium access, and the like. For example, the directionality of transmissions and/or receptions prove a certain level of interference isolation in mmW systems. Moreover, mmW communications in an asynchronous (or partially synchronized) network also introduce unique challenges. Conventional design techniques may opt for transmission restraint to avoid interference, which may minimize channel reuse and lead to wasted resources.

Aspects of the disclosure are initially described in the context of a wireless communications system. Aspects of the disclosure provide varying techniques that, either individually or in any combination, support a single beam directional listen-before-talk (LBT) procedure in an asynchronous (or partially synchronized) wireless communications system. For example, in one aspect a base station may use a channel access procedure in conjunction with reservation signaling on a single beam first, and then on a second beam afterwards. The base station may perform an energy detection, preamble based, or some other channel access procedure on a channel using a first beam configuration (e.g., using beam X). The base station may, if the channel access procedure is successful, transmit a reservation request message (RRQ) to a UE using a second beam configuration (e.g., using beam X or X', where X' is the same as or narrower than X). In response to the RRQ, the base station may receive a reservation response message (RRS) from the UE that was transmitted using a third beam configuration. The third beam configuration may be based, at least in some aspects, on the second beam configuration. The third beam configuration may be a transmit beam of the UE that has a beam width based on the capabilities of the UE, based on the beam width of the second beam configuration, and the like.

In another aspect, the base station may additionally or alternatively transmit data to the UE based on an energy detection based LBT procedure. For example, the base station may use multiple beam configurations and/or over multiple slots perform the energy detection based LBT procedures on the channel and determine that the channel is available for data communications using a first beam configuration based on the LBT procedures. The base station may transmit the data communications to the UE using the identified first beam configuration.

In another aspect, the base station may additionally or alternatively trigger the UE to begin monitoring for reservation signaling during a certain time period. For example, the base station may determine that data is pending for the UE and transmit an indication of the time period that the UE is to monitor the channel for the reservation signaling (e.g., RRQ, RRS, preamble messages, and the like). The UE may receive the indication from the base station and monitor the channel during the indicated time period. The base station may perform a channel access procedure with the UE and transmit the reservation signaling to the UE. The UE may receive the reservation signaling associated with the data communications and then receive the data communications transmitted from the base station.

In another aspect, the base station may additionally or alternatively in an uplink scenario transmit the RRS to the UE to confirm that the uplink resources are allocated. For example, the base station may perform the channel access procedure on the channel and transmit the RRQ if the channel access procedure is successful, as is discussed above. The base station may transmit an RRS to the UE without expecting a response from the UE.

In another aspect, the UE may additionally or alternatively sense the medium on the beam direction of its uplink transmission using an inter-frame spacing between downlink and uplink portions of the transmission opportunity (TxOP). For example, the UE may receive the RRQ for the TxOP from the base station and transmit the RRS in response to the RRQ. The UE may identify a beam configuration based on the inter-frame spacing between a downlink portion of the TxOP and an uplink portion of the TxOP and use the beam configuration to sense the medium (e.g., to perform a channel access procedure).

Aspects of the disclosure are further illustrated by and described with reference to apparatus diagrams, system diagrams, and flowcharts that relate to asynchronous single beam directional LBT.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, and NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may perform a channel access procedure on a shared radio frequency spectrum band using a first beam configuration. The base station 105 may transmit, based at least in part on successful completion of the channel access procedure, an RRQ to a UE 115 using a second beam configuration, the second beam configuration comprising a beam width that is equal to or narrower (e.g., corresponding to a higher antenna gain than the antenna gain of the first beam configuration) than a beam width of the first beam configuration. The base station 105 may receive an RRS from the UE 115 in response to the RRQ, the RRS comprising a third beam configuration that is based at least in part on the second beam configuration.

A base station 105 may perform a sequential energy detection-based LBT channel access procedure on a shared radio frequency spectrum band using a plurality of beam configurations. The base station 105 may determine, based at least in part on successful completion of the channel access procedure for a first beam configuration of the plurality of beam configurations, that the shared radio frequency spectrum band is available for data communications using the first beam configuration. The base station 105 may transmit the data communications on the shared radio frequency spectrum band using the first beam configuration.

A base station 105 may determine that downlink data is pending for a UE 115. The base station 105 may transmit, based at least in part on the determining, an indication of a time period during which the UE 115 is to monitor a shared radio frequency spectrum band for one or more of a reservation request message, a reservation response message, or a preamble message from the base station. The base station 105 may perform a channel access procedure with the UE 115. The base station 105 may transmit, based at least in part on the channel access procedure, the reservation message to the UE 115 within the predefined time period.

A UE 115 may receive, from a base station 105, an indication of a time period during which UE 115 is to monitor a shared radio frequency spectrum band for one or more of a reservation request message, a reservation response message, or a preamble message from the base station. The UE 115 may monitor the shared radio frequency spectrum band during the time period to receive at least one of the reservation request message, the reservation response message, or the preamble message from the base station 105. The UE 115 may receive downlink data from the base station 105 based at least in part on the received reservation request message, reservation response message, or preamble message from the base station 105.

A base station 105 may perform a channel access procedure on a shared radio frequency spectrum band using a first beam configuration. The base station 105 may transmit, based at least in part on successful completion of the channel access procedure, an RRQ to a UE 115 using a second beam configuration, the second beam configuration comprising a beam width that is equal to or narrower than a beam width of the first beam configuration. The base station 105 may transmit an RRS to the UE 115 in response to the RRQ, the RRS comprising a third beam configuration that is based at least in part on the second beam configuration.

A UE 115 may receive an RRQ for a transmission opportunity from a base station 105 over a shared radio frequency spectrum band. The UE 115 may transmit an RRS to the base station 105 over the shared radio frequency spectrum band in response to the RRQ. The UE 115 may identify a beam configuration based at least in part on an inter-frame spacing between a downlink portion of the transmission opportunity and an uplink opportunity of the transmission opportunity. The UE 115 may perform a channel access procedure using the second beam configuration.

Figure 2:
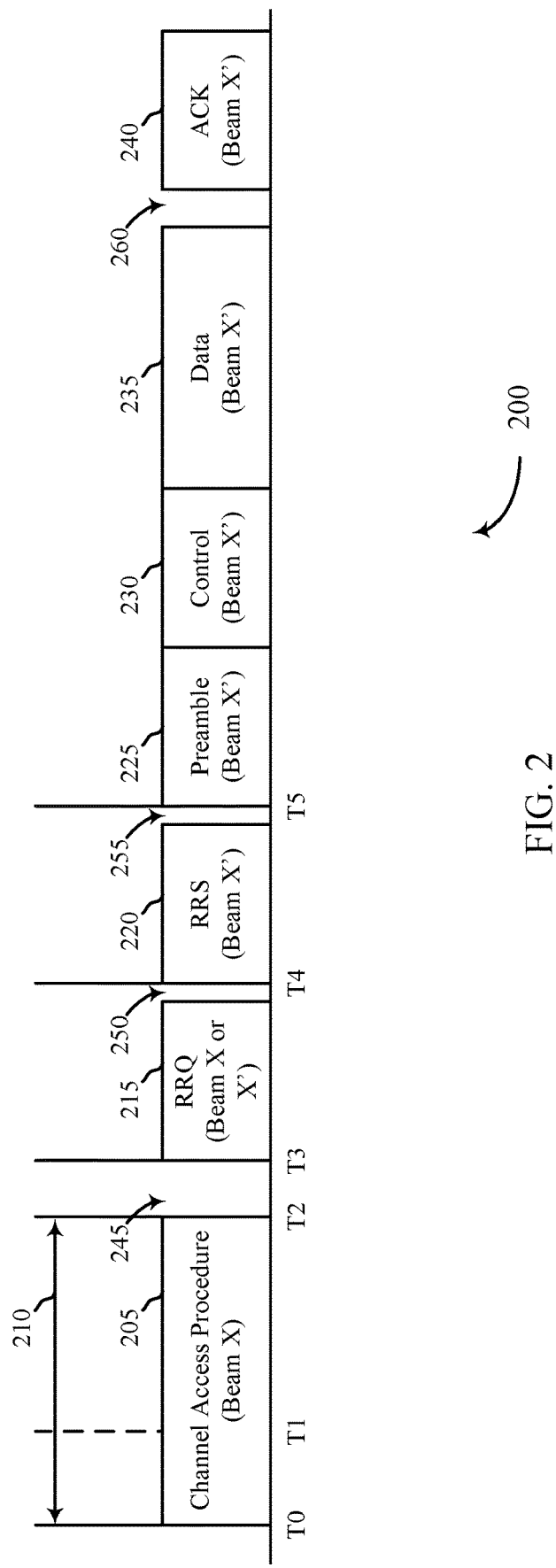
FIG. 2 illustrates an example of a timing diagram that supports asynchronous single beam directional LBT in accordance with aspects of the present disclosure.

FIG. 2 illustrates an example of a timing diagram 200 that supports asynchronous single beam directional LBT in accordance with various aspects of the present disclosure. In some examples, timing diagram 200 may implement aspects of wireless communications system 100. Aspects of timing diagram 200 may be implemented by a UE or a base station, which may be examples of the corresponding devices described herein. Generally, timing diagram 200 illustrates one example technique for a single beam asynchronous LBT procedure in a downlink scenario.

Generally, timing diagram 200 illustrates one example technique for an LBT procedure on a designated beam direction. The timing diagram 200 may include a channel access procedure 205 that occurs during a period 210, the period 210 occurring between time T0 and time T2. At time T1, a second data packet may arrive for transmission to the UE or to a different UE. At time T0 a base station may receive a packet for transmission to a UE and begin performing the channel access procedure 205 on a shared radio frequency spectrum band in response. The base station may use a first beam configuration for the channel access procedure 205. In some aspects, the base station may select the first beam configuration, which may be beam X in some examples, that has a first beam width. In some examples, the first beam configuration may be a P1 beam (e.g., a layer 1 beam).

The channel access procedure 205 may be an energy detection LBT procedure, a preamble based LBT procedure, and the like. For example, the base station may select thresholds for energy detection and/or preamble detection to use during the channel access procedure 205. In some aspects, the channel access procedure 205 may include energy detection over N contention slots (countdown from N to 0). In some aspects, the channel access procedure 205 may include the base station monitoring for RRS or RRQ over M slots.

The channel access procedure 205 may be considered successful if the channel is determined available for communicating the downlink data and unsuccessful if the base station detects an energy level/preamble above the threshold and/or other RRQ/RRS exchanges on the channel during the channel access procedure. In some aspects, the channel access procedure may be considered successful when there are no active RRQ or RRS exchanges detected during the channel access procedure. An active RRQ or RRS exchange may include the base station detecting a corresponding preamble message in conjunction with the RRQ or RRS.

In some aspects, the channel access procedure 205 may be operator-based. For example, the base station may determine that an active RRQ or RRS is received from other devices during the channel access procedure 205 and perform a backoff procedure based on the active RRQ or RRS for the operator of the base station (e.g., first operator) and/or for a different operator (second operator).

If the channel access procedure 205 is successful and at time T3, the base station may transmit an RRQ 215 to the UE. Generally, the RRQ 215 may include a reservation request for a particular direction. In this context, direction may refer to a transmit-receive beam pair, with uplink and downlink representing different directions. The RRQ 215 may be transmitted using a second beam configuration that uses the same beam width as the first beam configuration (e.g., beam X) or a narrower beam configuration (e.g., beam X').

In some aspects, the second beam configuration has a narrower beam width as the first beam configuration and the base station may select the energy/preamble detection threshold for the channel access procedure 205 based on the beam width of the first beam configuration. In some aspects, the base station may select the energy/preamble detection threshold for the channel access procedure 205 based on the difference in the beam width between the first and second beam configurations. In some aspects, the base station may select the energy/preamble detection threshold for the channel access procedure 205 based on wither the beam width of the first beam configuration is a P1 beam, a P2 beam (e.g., a layer 2 beam), or a P3 beam (e.g., a layer 3 beam).

In some aspects, the second beam configuration have the same beam width as the first beam configuration and the base station may select the energy/preamble detection threshold for the channel access procedure 205 based on the beam width. When the base station has multiple UEs with available data, the base station may configure each UE with orthogonal resources to use for the RRSs. the base station may select the energy/preamble detection threshold for the channel access procedure 205 based on the third beam configuration.

At time T4 and in response to the RRQ 215, the base station may receive an RRS 220 from the UE. The RRS 220 may be for a particular direction. The RRS 220 may have a third beam configuration that is based at least in part on the second beam configuration. The RRS 220 may be received on a beam pair link (BPL) that is based on the second beam configuration (e.g., the UE may transmit the RRS 220 using a beam configuration that is selected based on the second beam configuration (e.g., beam X')).

In some aspects, the UE may monitor for the RRQ from the base station. For example, the UE may perform continuous listening of preambles on its receive beam. This solution may include the UE exceeding a power usage threshold as the UE is monitoring for preambles all the time, regardless of being scheduled or not. In another example, the UE may not listen for preambles continuously due to power consumption considerations. However, this solution may lead to UE missing preambles that were transmitted when the UE was not listening. In another example, the UE may optionally perform a K slot energy detection prior to reservation response. In some aspects, a UE that does not listen to preambles continuously may use a different energy/preamble detection threshold.

In some aspects, the UE may monitor for the RRQ (or any reservation signaling) based on a medium sensing trigger received from the base station. For example, at T ms prior to potentially scheduling a UE, the base station may send a trigger signal to UE to start monitoring the medium for preambles and reservation messages to avoid the deafness issue from the UE side as well as limit the power consumption. One choice of T may be the nominal TxOP length as specified for the medium. Therefore, the base station may determine that downlink data is pending for the UE and transmit an indication of a time period during which the UE is to monitor a shared radio frequency spectrum band for reservation signaling (e.g., any one of a reservation request message, a reservation response message, or a preamble message from the base station). The base station may perform a channel access procedure with the UE and transmit the reservation message to the UE within the predefined time period. The UE may receive the indication of the time period during which UE is to monitor the shared radio frequency spectrum band for one or more reservation signaling and monitor the shared radio frequency spectrum band during the time period to receive the reservation signaling from the base station. The UE may receive downlink data from the base station based at least in part on the received reservation signaling. The UE may use a non-continuous monitoring configuration to monitor the shared radio frequency spectrum band.

At time T5, the base station may transmit a preamble 225 in response to the RRS 220 using the second beam configuration. The preamble 225 may be configured to confirm a reservation for uplink communications from the UE (when applicable) in the particular direction.

The base station may then transmit a control signal indicating one or more resources to be used for data communications 235 with the UE. The base station may transmit the data communication 235 using the one or more resources. The UE may respond with an acknowledgement 240 acknowledging (ACK) or negative acknowledging (NACK) successful receipt of the data communications 235.

In some aspects, the timing diagram 200 may also include a deferment period 245, a first inter-frame spacing (IFS) 250, and a second IFS 255. Generally, the base station may make scheduling decisions (e.g., with regards to the particular channel access procedure 205, whether to or how to configure the RRQ 215 transmission, and/or whether to and how to configure the preamble 225 transmission) at each of the deferment period 245, the first IFS 250, and the second IFS 255, respectively. For example, the base station may determine whether to perform the channel access procedure 205 based on data arriving at time T0. The base station may determine whether to transmit (and how to configure) the RRQ 215 based on the success or failure of the channel access procedure 205. The base station may determine whether to transmit (and how to configure) the preamble 225 based on receiving the RRS 220 from the UE.

In some aspects, the rules for the contention based channel access procedure 205 (e.g., RRQ 215) may include the base station tracking preambles on beam X only when listening on beam X (not when receiving on any other beam, transmitting on any other beam, or listening on any other beam). When the base station is not listening on a beam, it experiences "deafness" and it does not track reservation messages (e.g., RRQ/RRS). Thus, timing diagram 200 illustrates one example of when the base station transmits RRQ 215 to capture the medium on a particular beam direction. In some aspects, the base station may transmit RRQ 215 on a contention beam if no other RRQs or RRSs are heard on the contention beam (e.g., the first beam configuration and/or using a P1 or P2 beam approach). In some aspects, the base station may transmit RRQ 215 on any P2 beam, which is a subset of the P1 beam on which contention was performed (e.g., channel access procedure 205). In some aspects, the base station may transmit the RRQ 215 when no other "active" RRQs or RRSs are heard on the contention beam (e.g., the first beam configuration used for the channel access procedure 205). An active RRQ may be defined as one which is confirmed with a preamble message subsequent to the reception of an RRS and a scheduling decision on that beam direction. The same P1 or P2 subset of P1 beam rule may be used. In some aspects, the base station may transmit RRQ 215 if no other RRS is heard (e.g., a receiver centric LBT procedure) on the contention beam. The same P1 or P2 subset of P1 beam rule may be applied.

In some aspects, an RRQ 215 may be considered "active" if a preamble follows the RRS within a pre-determined time "T." When detected, the base station may perform a backoff only to other operator's reservation message (RRQ or RRS). In some aspects, the base station may backoff its own operator preamble in addition to other operator's preamble.

Although timing diagram 200 illustrates one example of an RRQ/RRS/preamble exchange that may be used by a base station for data communications, other configurations are also provided in the present disclosure. For example, the base station may simply perform the channel access procedure 205 and, if the channel is clear, transmit the data communications 235 to the UE using the first beam configuration. That is, the RRQ 215, RRS 220, and preamble 225 may be omitted. In some examples, the base station may also transmit the control signaling 330 prior to the data communications 235.

Thus, a base station may perform a sequential energy detection-based LBT channel access procedure 205 on a shared radio frequency spectrum band using a plurality of beam configurations. The base station may determine, based at least in part on successful completion of the channel access procedure and for a first beam configuration of a plurality of beam configurations, that the shared radio frequency spectrum band is available for data communications using the first beam configuration. The base station may transmit the data communications 235 on the shared radio frequency spectrum band using the first beam configuration.

Figure 3:
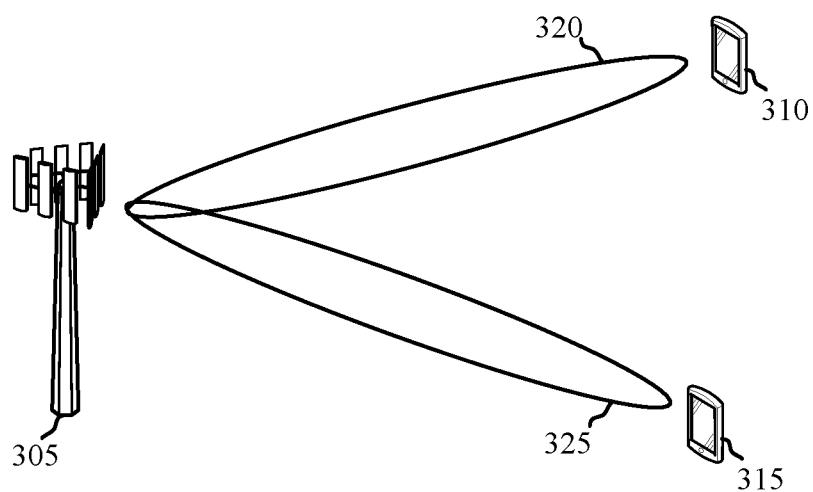
FIGS. 3 and 4 illustrate examples of a wireless communications systems that support asynchronous single beam directional LBT in accordance with aspects of the present disclosure.

FIG. 3 illustrates an example of a wireless communications system 300 that supports asynchronous single beam directional LBT in accordance with various aspects of the present disclosure. In some examples, wireless communications system 300 may implement aspects of wireless communications system 100 and/or timing diagram 200. Wireless communications system 300 may include a base station 305, a UE 310, and a UE 315, which may be examples of the corresponding devices described herein.

Generally, with multiple UEs 310 and 315 to schedule, the base station 305 contends for the channel in the direction of the respective UE to be scheduled and sequentially for each direction. For example, contention (e.g., the channel access procedure 205 of FIG. 2) may include energy detection over N contention slots (counting down from N to 0) and/or monitoring reservation messages over M slots. The base station 305 may contend for the channel for on each UE beam sequentially. This may provide an improved probability of medium capture due to directionality of the channel access procedure with no mismatches between contention directions and interference directions. In some aspects, the scheduling decision may be made prior to medium sensing (e.g., if contention failed, a new direction may begin all over again). However, instead the scheduler decision may be deferred to the post-contention phase.

Thus, base station 305 may determine that downlink data is available for multiple UEs (e.g., UE 310 and UE 315). Accordingly, the base station 305 may perform a sequence of channel access procedures over a plurality of corresponding beam directions using the first beam configuration. For example, the base station 305 may perform a first channel access procedure in a first direction towards UE 310 using beam configuration 320 and then perform a second channel access procedure in a second direction towards UE 315 using beam configuration 325. Beam configurations 320 and 325 may each use the first beam configuration such that they have the same beam width. As discussed, the channel access procedures in each beam direction may include the base station 305 detecting an energy level in each direction over a certain number of contention slots (e.g., N contention slots) or the base station 305 monitoring for RSSs over the certain number of contention slots (e.g., the M slots). Based on the channel access procedures being successful in each beam direction, the base station 305 may transmit the RRQ to the respective UE using the second beam configuration that has the same or narrower beam width than the first beam configuration. The base station 305 may receive an RRS in response to the RRQ from the respective UEs 310 and 315.

Figure 4:
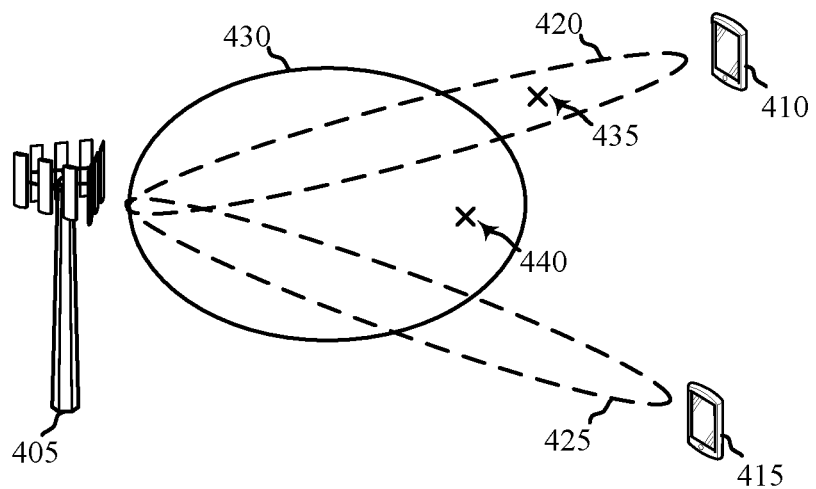

FIG. 4 illustrates an example of a wireless communications system 400 that supports asynchronous single beam directional LBT in accordance with various aspects of the present disclosure. In some examples, wireless communications system 400 may implement aspects of wireless communications systems 100/300 and/or timing diagram 200. Wireless communications system 400 may include a base station 405, a UE 410, and a UE 415, which may be examples of the corresponding devices described herein.

Generally, with multiple UEs 310 and 315 to schedule, the base station 305 may use a wider beam so as to provide greater flexibility in the RRQ/RRS phase. For example, the beam configuration used for the RRQ (e.g., second beam configuration) may be sent in the subspace of the beam configuration used for contention (e.g., the first beam configuration), allowing for a delayed scheduler decision. This may improve scheduler flexibility, but may have an associated reduced probability of clearance. The channel access procedure/RRQ beam mismatch may use different thresholds and may lead to hidden nodes resulting from beam mismatch. To address the potential beam mismatch in sensing/contention and transmission, a modified contention criteria may be used. In one example, the energy/preamble detection threshold may be a function of the beam width used for contention. In another example, the energy/preamble detection threshold may be a function of the relative difference in beamwidths of the contention beam and RRQ transmission beam. In yet another example, the energy/preamble detection threshold may be based on whether the beams used for sensing are P1, P2, or P3 beams.

Thus, base station 405 may use a first beam configuration 430 to perform a channel access procedure with each of UEs 410 and 415. The first beam configuration 430 may have a wide beam width. The base station 405 may then transmit, based on the channel access procedures being successful, RRQ to each of UEs 410 and 415 using second beam configurations 420 and 425. Each of the second beam configurations 420 and 425 may have a narrower beam width than the first beam configuration 430. The base station 305 may receive an RRS in response to the RRQ from the respective UEs 410 and 415.

As discussed, the beam mismatch may be result in reduced probability of clearance. For example, a UE located at position 435 may miss the channel clearance procedure (e.g., may not be detected, and therefore protected by the base station 405 due to the UE being located outside of the coverage area of the first beam configuration 430. This may result in the UE located at position 435 being interfered with by more directional transmissions from UE 410 and/or base station 405 (e.g., transmissions using the second beam configuration 420). Similarly, a UE located at position 440 may result in a false alarm during the channel access procedure. For example, the UE located at position 440 may not be a victim of interference from more directional transmissions from UE 415 and/or base station 405, but may unnecessarily block the channel access procedure. To address such concerns, the modified contention criteria may be used.

In some aspects, the base station 405 may use the first beam configuration 430 for contention and RRQ (e.g., as both the first and second beam configuration). One outcome to such an approach may include one of multiple UEs responding with RRS which the base station 405 may schedule the one of multiple UEs based on RRS response. In some aspects, there may be no mismatch in energy/preamble detection threshold and transmission, since RRQ is transmitted over a wider beam (e.g., the same beam configuration as is used on the channel access procedure). This may improve multi-user scheduling diversity and have a greater probability of one of multiple UE responding with RRS than just a single UE. However, RRS from multiple UEs could result on over silencing.

To address such concerns, the UEs may configured with designated orthogonal resources for the RRS transmission. Another approach may include the UEs being configured with overlapping resources for the RRS transmissions with different threshold for detection to compensate for colliding RRS messages at the base station 405.

Figure 5:
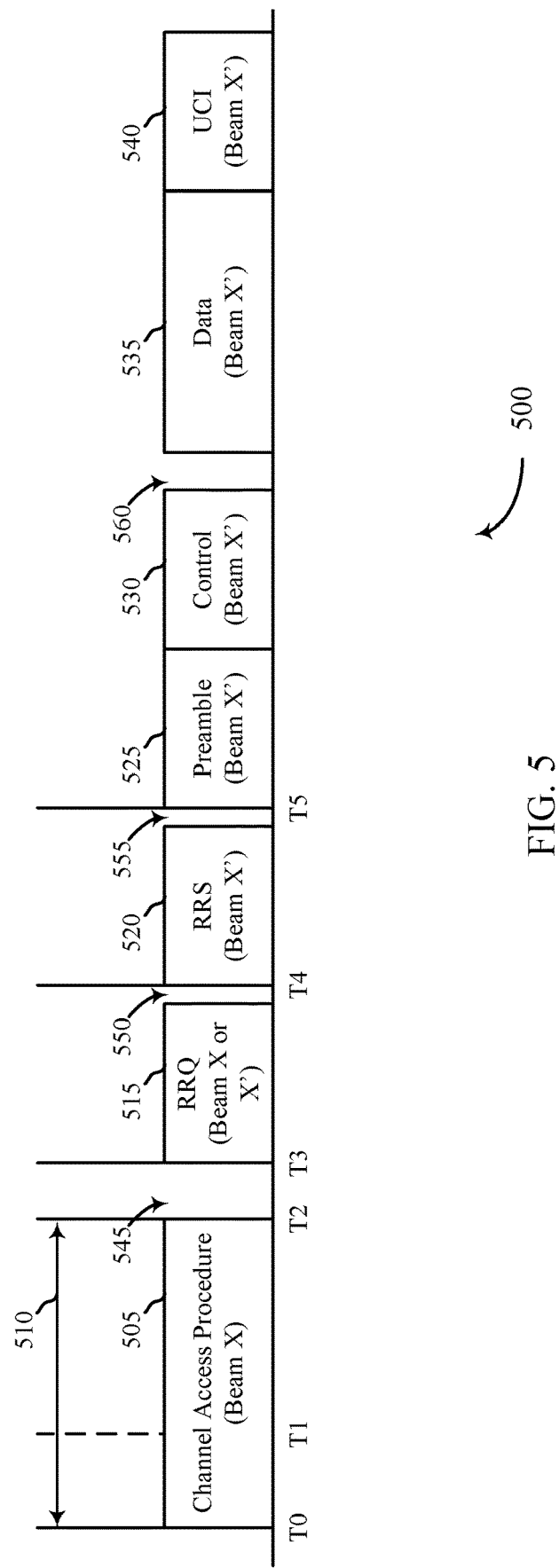
FIG. 5 illustrates an example of a timing diagram that supports asynchronous single beam directional LBT in accordance with aspects of the present disclosure.

FIG. 5 illustrates an example of a timing diagram 500 that supports asynchronous single beam directional LBT in accordance with various aspects of the present disclosure. In some examples, timing diagram 500 may implement aspects of wireless communications system 100/300/400, and/or timing diagram 200. Aspects of timing diagram 500 may be implemented by a UE or a base station, which may be examples of the corresponding devices described herein. Generally, timing diagram 500 illustrates one example technique for a single beam asynchronous LBT procedure in an uplink scenario.

Generally, timing diagram 500 illustrates one example technique for an LBT procedure on a designated beam direction for uplink operations. The timing diagram 500 may include a channel access procedure 505 that occurs during a period 510, the period 510 occurring between time T0 and time T2. At time T1, a second data packet may arrive for transmission to the UE or to a different UE. At time T0 a base station may receive a packet for transmission to a UE and begin performing the channel access procedure 505 on a shared radio frequency spectrum band in response. The base station may use a first beam configuration for the channel access procedure 505. In some aspects, the base station may select the first beam configuration, which may be beam X in some examples, that has a first beam width. In some examples, the first beam configuration may be a P1 beam.

The channel access procedure 505 may be an energy detection LBT procedure, a preamble based LBT procedure, and the like. For example, the base station may select thresholds for energy detection and/or preamble detection to use during the channel access procedure 505. In some aspects, the channel access procedure 505 may include energy detection over N contention slots (countdown from N to 0). In some aspects, the channel access procedure 505 may include the base station monitoring for RRS or RRQ over M slots.

The channel access procedure 505 may be considered successful if the channel is determined available for communicating the downlink data and unsuccessful if the base station detects an energy level/preamble above the threshold and/or other RRQ/RRS exchanges on the channel during the channel access procedure. In some aspects, the channel access procedure may be considered successful when there are no active RRQ or RRS exchanges detected during the channel access procedure.

In some aspects, the channel access procedure 505 may be operator-based. For example, the base station may determine that an active RRQ or RRS is received from other devices during the channel access procedure 505 and perform a backoff procedure based on the active RRQ or RRS for the operator of the base station (e.g., first operator) and/or for a different operator (second operator).

If the channel access procedure 505 is successful and at time T3, the base station may transmit an RRQ 515 to the UE. Generally, the RRQ 515 may include a reservation request for a particular direction. In this context, direction may refer to a transmit-receive beam pair, with uplink and downlink representing different directions. The RRQ 515 may be transmitted using a second beam configuration that uses the same beam width as the first beam configuration (e.g., beam X) or a narrower beam configuration (e.g., beam X').

In some aspects, the second beam configuration has a narrower beam width as the first beam configuration and the base station may select the energy/preamble detection threshold for the channel access procedure 505 based on the beam width of the first beam configuration. In some aspects, the second beam configuration have the same beam width as the first beam configuration and the base station may select the energy/preamble detection threshold for the channel access procedure 505 based on the beam width.

At time T4 and in response to the RRQ 515, the base station may transmit an RRS 520 to the UE. The RRS 520 may be for a particular direction. The RRS 520 may have a third beam configuration that is based at least in part on the second beam configuration. In some aspects, the RRQ 515 from the base station may be followed by the RRS 520. In some examples, there may be no designated response expected from the UE. For mechanisms where a device backs off only to receipt of an RRS on a beam direction, the RRS may be sent by the receiver. Additional transaction involving UE is thus eliminated. However, in case the UE is not able to capture the medium, the reservation by base stations RRS may be unused and reduce reuse.

Thus, a base station may perform the channel access procedure 505 on the shared radio frequency spectrum band using a first beam configuration. The base station may transmit, based at least in part on successful completion of the channel access procedure, the RRQ 215 to a UE using a second beam configuration, the second beam configuration comprising a beam width that is equal to or narrower than a beam width of the first beam configuration. The base station may transmit the RRS 520 to the UE in response to the RRQ 515, the RRS 520 including a third beam configuration that is based at least in part on the second beam configuration.

In other examples, the RRQ 515 from the base station may be followed by the RRS 520 transmitted from the UE (not shown). In this example, the base station may follow by transmitting the preamble 525 which acts or otherwise serves the same purpose as an "RRS" from the base station, i.e., the preamble confirms reservation of the medium.

Thus, at time T5 the base station may optionally transmit the preamble message 525 following the RRS 520 using the second beam configuration. The preamble 525 may be configured to confirm a reservation for uplink communications from the UE in the particular direction.

The base station may then transmit a control signal 530 indicating one or more uplink resources to be used for data communications 535 from the UE. The UE may transmit the data communication 535 using the one or more resources. The UE may transmit UCI 540 following the data communications 535.

In some aspects, the timing diagram 500 may also include a deferment period 545, a first IFS 550, a second IFS 555, and a third IFS 560. Generally, the base station may make scheduling decisions (e.g., with regards to the particular channel access procedure 505, whether to or how to configure the RRQ 515 transmission, and/or whether to and how to configure the preamble 525 transmission) at each of the deferment period 545, the first IFS 550, and the second IFS 555, respectively. The third IFS 560 may be a gap period that provides an opportunity for the UE to sense the medium on the beam direction of its transmission. This can be performed using the third IFS 560 occurring between the downlink portion of the TxOP (e.g., the control signaling 530) and an uplink portion of the TxOP (e.g., the data communication 535).

Therefore, the UE may receive the RRQ 515 for a TxOP from a base station over a shared radio frequency spectrum band. The UE may transmit an RRS 520 to the base station over the shared radio frequency spectrum band in response to the RRQ 515. The UE may identify a beam configuration based at least in part on the third IFS 560 between the downlink portion of the transmission opportunity and the uplink opportunity of the TxOP. The UE may perform a channel access procedure using the second beam configuration.

Figure 6:
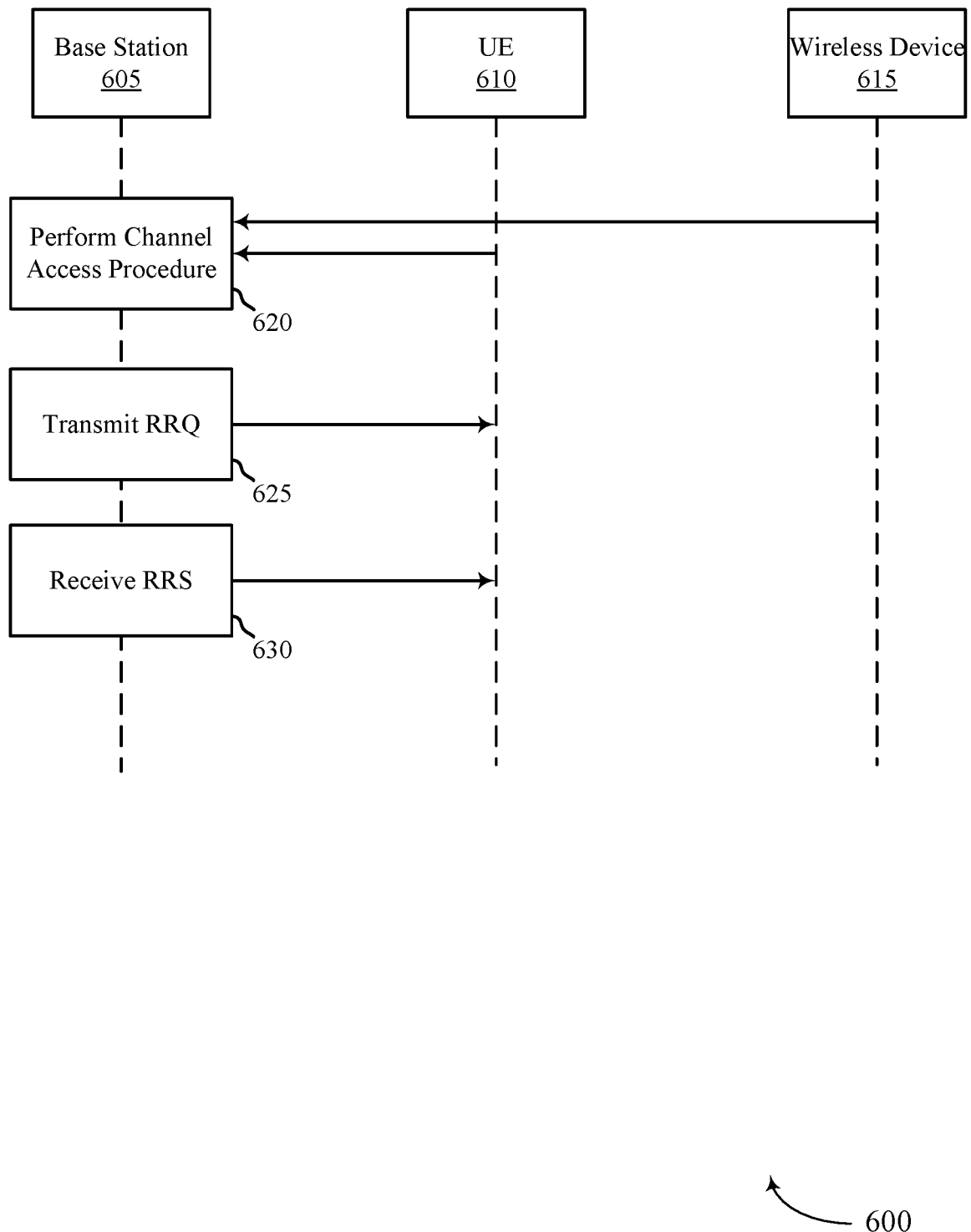
FIG. 6 illustrates an example of a process flow that supports asynchronous single beam directional LBT in accordance with aspects of the present disclosure.

FIG. 6 illustrates an example of a process 600 that supports asynchronous single beam directional LBT in accordance with various aspects of the present disclosure. In some examples, process 600 may implement aspects of wireless communications systems 100/300/400 and/or timing diagrams 200/500. Process 600 may include a base station 605, a UE 610, and a wireless device 615 (which may be a UE or a base station), which may be examples of the corresponding devices described herein.

Generally, process 600 illustrates one example of an asynchronous (or partially synchronous) single beam directional LBT procedure. The LBT procedure may include LBT on a designated beam direction and may use the following: energy detection over N contention slots; reservation request message for a particular direction (RRQ); reservation response message for a particular direction (RRS), and reservation confirmation for a particular direction (Preamble).

At 620, the base station 605 may perform a channel access procedure on a shared radio frequency spectrum band using a first beam configuration. The channel access procedure may be energy detection based, preamble based, RRS/RRQ exchange based, an active RRQ or RRS procedure based, and the like. The channel access procedure may include the base station 605 monitoring the channel for transmissions from the UE 610 and/or other devices, such as wireless device 615. The base station 605 may determine that the channel is available based on the channel access procedure being successful.

At 625, the base station 605 may transmit, based at least in part on successful completion of the channel access procedure, an RRQ to UE 610 using a second beam configuration, the second beam configuration comprising a beam width that is equal to or narrower than a beam width of the first beam configuration. The RRQ may include a request to reserve the channel in a particular direction (e.g., in the direction towards UE 610).

At 630, the base station 605 may receive an RRS from the UE 610 in response to the RRQ, the RRS comprising a third beam configuration that is based at least in part on the second beam configuration. The RRS may confirm (from UE 610) the requested reservation in the particular direction.

Figure 7:
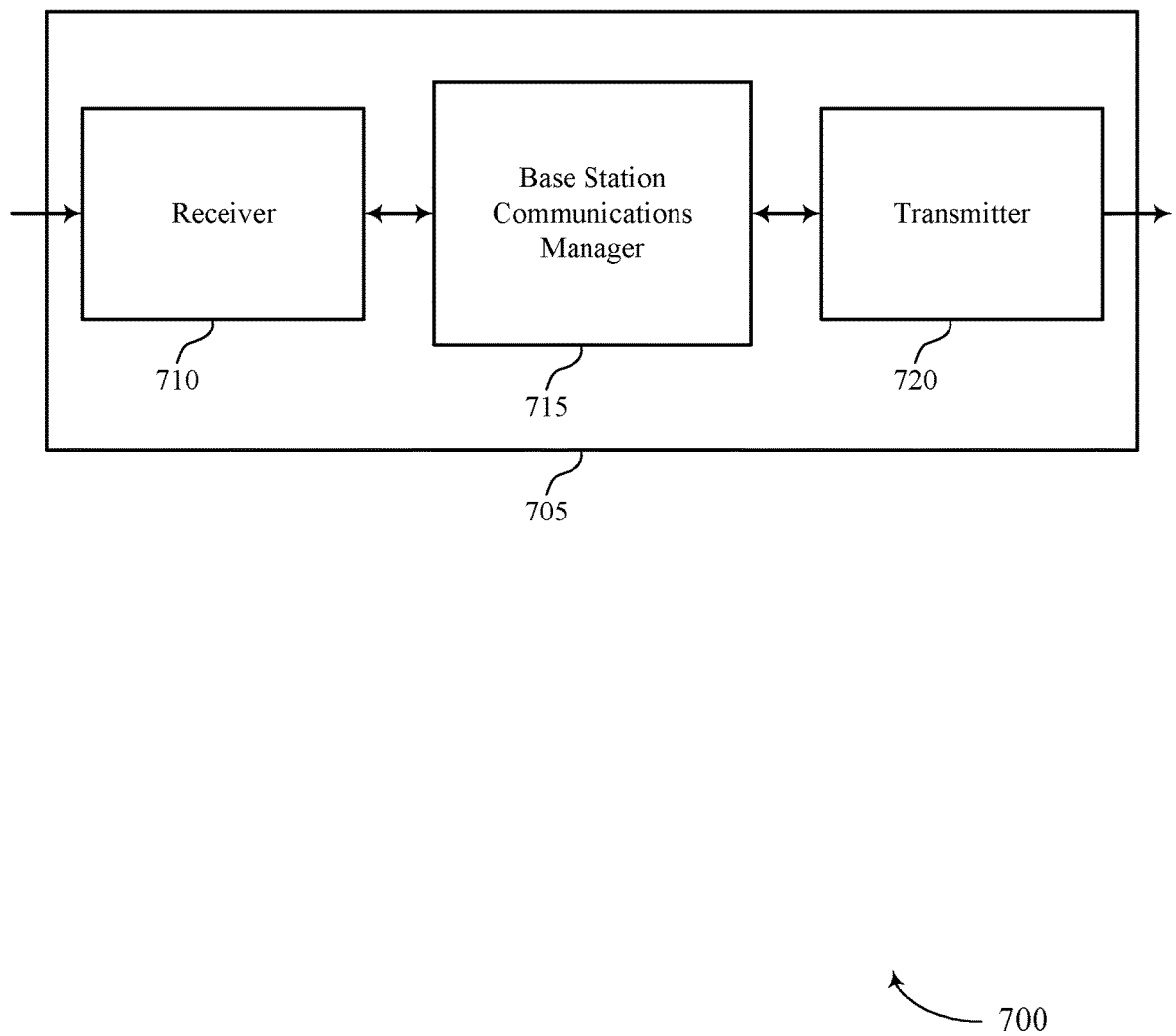
FIGS. 7 through 9 show block diagrams of a device that supports asynchronous single beam directional LBT in accordance with aspects of the present disclosure.

FIG. 7 shows a block diagram 700 of a wireless device 705 that supports asynchronous single beam directional LBT in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to asynchronous single beam directional LBT). Information may be passed on to other components of the device. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may perform a channel access procedure on a shared radio frequency spectrum band using a first beam configuration, transmit, based on successful completion of the channel access procedure, an RRQ to a UE using a second beam configuration, the second beam configuration including a beam width that is equal to or narrower than a beam width of the first beam configuration, and receive an RRS from the UE in response to the RRQ, the RRS including a third beam configuration that is based on the second beam configuration. The base station communications manager 715 may also perform a sequential energy detection-based LBT channel access procedure on a shared radio frequency spectrum band using a set of beam configurations, determine, based on successful completion of the channel access procedure for a first beam configuration of the set of beam configurations, that the shared radio frequency spectrum band is available for data communications using the first beam configuration, and transmit the data communications on the shared radio frequency spectrum band using the first beam configuration. The base station communications manager 715 may also determine that downlink data is pending for a UE, transmit, based on the determining, an indication of a time period during which the UE is to monitor a shared radio frequency spectrum band for one or more of a reservation request message, a reservation response message, or a preamble message from the base station, perform a channel access procedure with the UE, and transmit, based on the channel access procedure, the reservation message to the UE within the predefined time period. The base station communications manager 715 may also perform a channel access procedure on a shared radio frequency spectrum band using a first beam configuration, transmit, based on successful completion of the channel access procedure, an RRQ to a UE using a second beam configuration, the second beam configuration including a beam width that is equal to or narrower than a beam width of the first beam configuration, and transmit an RRS to the UE in response to the RRQ, the RRS including a third beam configuration that is based on the second beam configuration.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
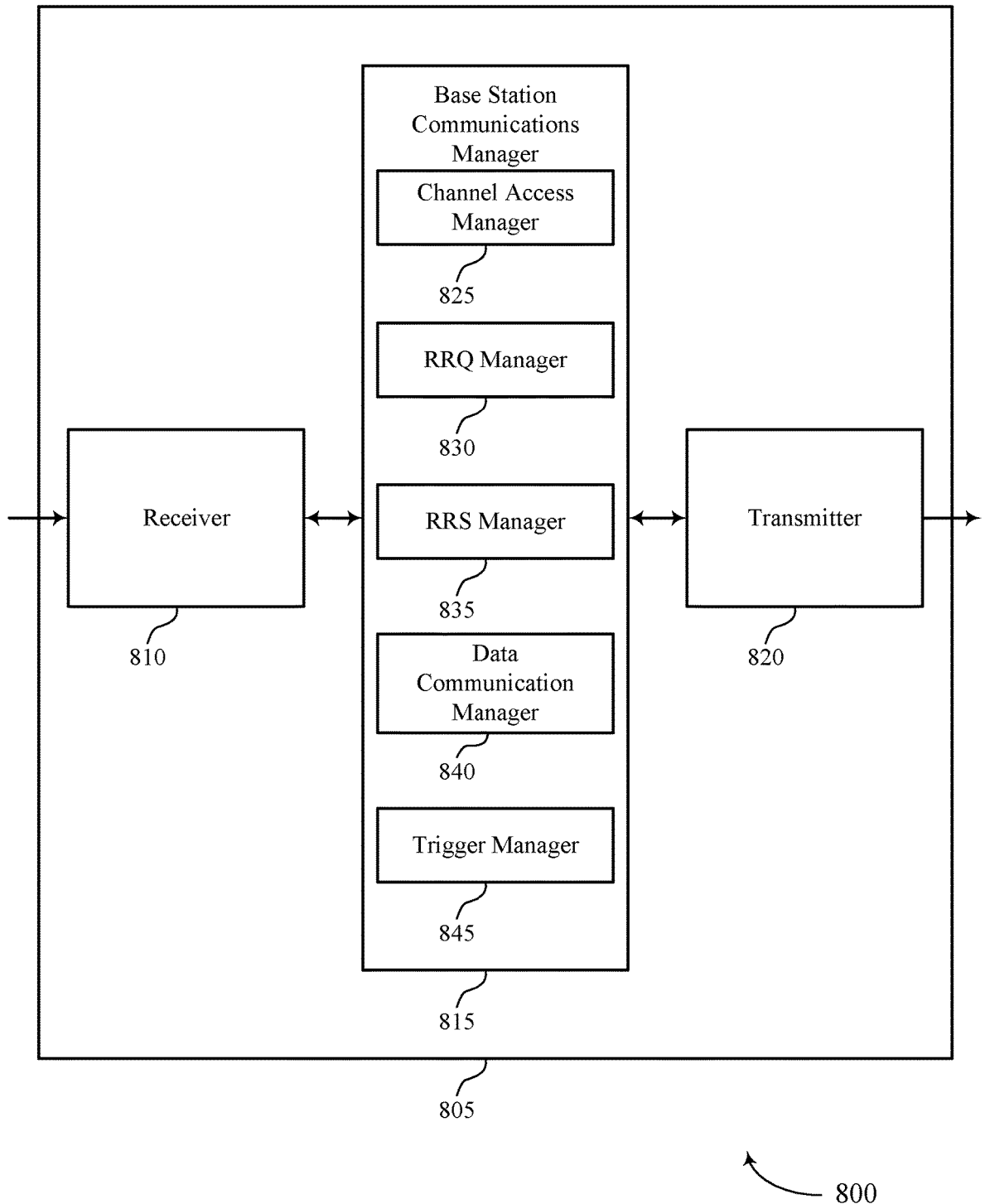

FIG. 8 shows a block diagram 800 of a wireless device 805 that supports asynchronous single beam directional LBT in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to asynchronous single beam directional LBT). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10.

Base station communications manager 815 may also include channel access manager 825, RRQ manager 830, RRS manager 835, data communication manager 840, and trigger manager 845.

Channel access manager 825 may perform a channel access procedure on a shared radio frequency spectrum band using a first beam configuration, perform a sequential energy detection-based LBT channel access procedure on a shared radio frequency spectrum band using a set of beam configurations, determine, based on successful completion of the channel access procedure for a first beam configuration of the set of beam configurations, that the shared radio frequency spectrum band is available for data communications using the first beam configuration, and perform a channel access procedure with the UE. In some cases, determining that the channel access procedure is successful includes: determining that no RRQ or RRS are received from other devices during the channel access procedure. In some cases, determining that the channel access procedure is successful includes: determining that no active RRQ or RRS are received from other devices during the channel access procedure, where an active RRQ or RRS includes detecting a corresponding preamble message transmitted in response to the RRQ or RRS. In some cases, the channel access procedure includes at least one of an energy-based LBT procedure or a preamble-based LBT procedure.

RRQ manager 830 may transmit, based on successful completion of the channel access procedure, a reservation request message (RRQ) to a UE using a second beam configuration, the second beam configuration including a beam width that is equal to or narrower than a beam width of the first beam configuration.

RRS manager 835 may receive a reservation response message (RRS) from the UE in response to the RRQ, the RRS including a third beam configuration that is based on the second beam configuration and transmit a reservation response message (RRS) to the UE in response to the RRQ, the RRS including a third beam configuration that is based on the second beam configuration.

Data communication manager 840 may transmit the data communications on the shared radio frequency spectrum band using the first beam configuration, determine that downlink data is pending for a UE, and transmit, based on the channel access procedure, the reservation message to the UE within the predefined time period.

Trigger manager 845 may transmit, based on the determining, an indication of a time period during which the UE is to monitor a shared radio frequency spectrum band for one or more of a reservation request message, a reservation response message, or a preamble message from the base station.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
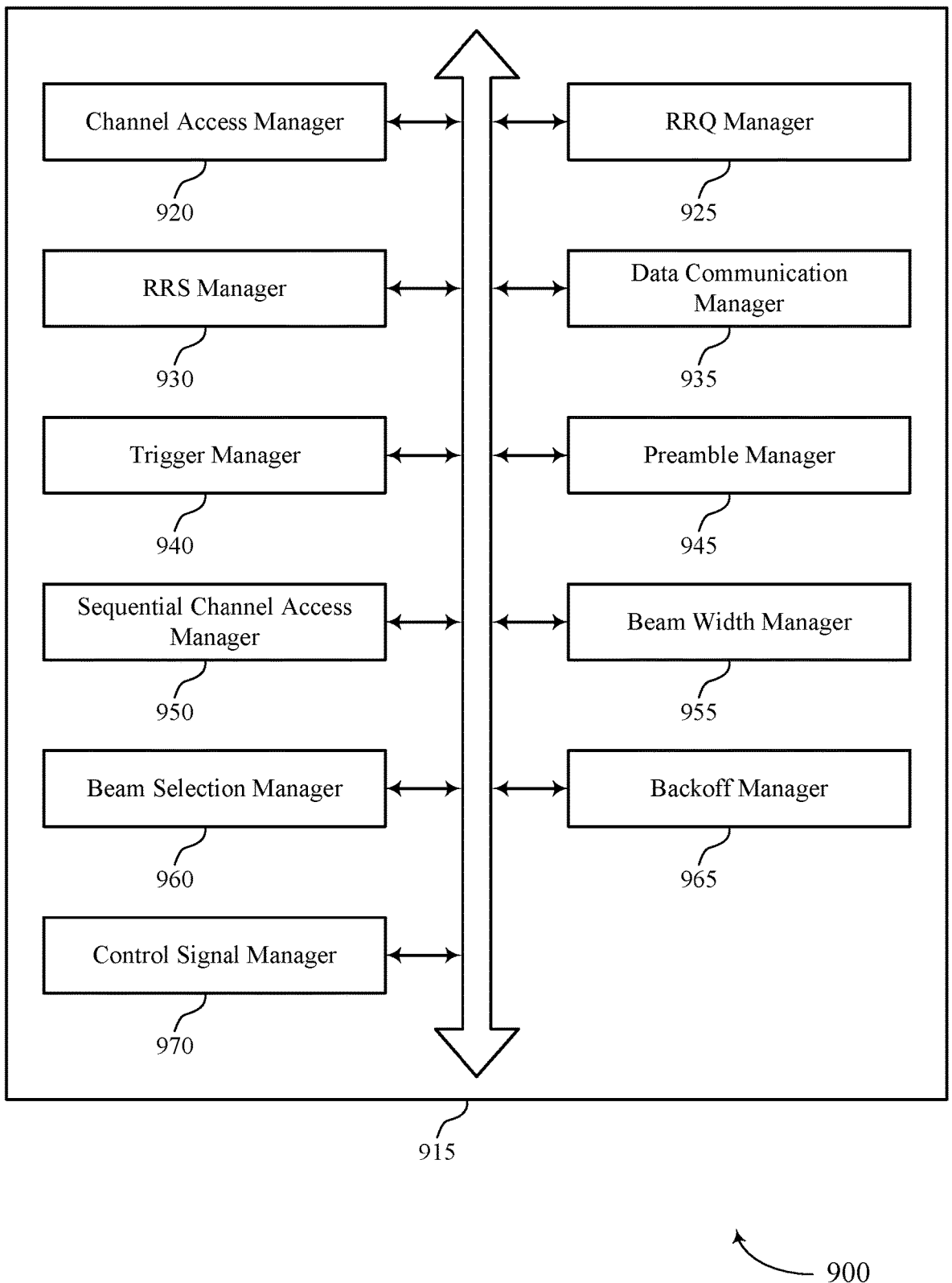

FIG. 9 shows a block diagram 900 of a base station communications manager 915 that supports asynchronous single beam directional LBT in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include channel access manager 920, RRQ manager 925, RRS manager 930, data communication manager 935, trigger manager 940, preamble manager 945, sequential channel access manager 950, beam width manager 955, beam selection manager 960, backoff manager 965, and control signal manager 970. Each of these modules may communicate, directly or indirectly, with one another (e.g., via one or more buses).

Channel access manager 920 may perform a channel access procedure on a shared radio frequency spectrum band using a first beam configuration, perform a sequential energy detection-based LBT channel access procedure on a shared radio frequency spectrum band using a set of beam configurations, determine, based on successful completion of the channel access procedure for a first beam configuration of the set of beam configurations, that the shared radio frequency spectrum band is available for data communications using the first beam configuration, and perform a channel access procedure with the UE. In some cases, determining that the channel access procedure is successful includes: determining that no RRQ or RRS are received from other devices during the channel access procedure. In some cases, determining that the channel access procedure is successful includes: determining that no active RRQ or RRS are received from other devices during the channel access procedure, where an active RRQ or RRS includes detecting a corresponding preamble message transmitted in response to the RRQ or RRS. In some cases, the channel access procedure includes at least one of an energy-based LBT procedure or a preamble-based LBT procedure.

RRQ manager 925 may transmit, based on successful completion of the channel access procedure, an RRQ to a UE using a second beam configuration, the second beam configuration including a beam width that is equal to or narrower than a beam width of the first beam configuration.

RRS manager 930 may receive an RRS from the UE in response to the RRQ, the RRS including a third beam configuration that is based on the second beam configuration and transmit an RRS to the UE in response to the RRQ, the RRS including a third beam configuration that is based on the second beam configuration.

Data communication manager 935 may transmit the data communications on the shared radio frequency spectrum band using the first beam configuration, determine that downlink data is pending for a UE, and transmit, based on the channel access procedure, the reservation message to the UE within the predefined time period.

Trigger manager 940 may transmit, based on the determining, an indication of a time period during which the UE is to monitor a shared radio frequency spectrum band for one or more of a reservation request message, a reservation response message, or a preamble message from the base station.

Preamble manager 945 may transmit a preamble message in response to the RRS using the second beam configuration, transmit a control signal indicating one or more resources to be used for data communications, transmit a data communication using the one or more resources, and configure a preamble message in response to the RRS using the second beam configuration, where the preamble message confirms a reservation for uplink communications from the UE.

Sequential channel access manager 950 may determine that downlink data is available for a set of UEs, perform, based on the determination, a sequence of channel access procedures over a set of corresponding beam directions using the first beam configuration, and perform the sequence of channel access procedures includes, for beam direction: detecting an energy level in each direction over a predetermined number of contention slots, or monitoring for RRSs over the predetermined number of contention slots.

Beam width manager 955 may select a first beam width for the first beam configuration, select a second beam width for the second beam configuration, the second beam width being narrower than the first beam width, select an energy or preamble detection threshold for the channel access procedure based on a width of the first beam width, select an energy or preamble detection threshold for the channel access procedure based on a difference between the first beam width and the second beam width, and select an energy or preamble detection threshold for the channel access procedure based on whether the first beam width includes a P1 beam, a P2 beam, or a P3 beam.

Beam selection manager 960 may select a first beam width for the first beam configuration and the second beam configuration, configure each UE of a set of UEs for which downlink data is available with orthogonal resources for receiving the corresponding RRSs, configure each UE of a set of UEs for which downlink data is available with overlapping resources for receiving the corresponding RRSs, and determine an energy or preamble detection threshold for detecting each corresponding RRS based on the third beam configuration.

Backoff manager 965 may determine that an active RRQ or active RRS is received from other devices during the channel access procedure, where an active RRQ or active RRS includes detecting a corresponding preamble message transmitted in response to the RRQ or RRS and within a fixed time period and perform a backoff procedure based on one or more of the active RRQ, the active RRS, an RRQ or RRS of a second operator, or an RRQ or RRS of the first operator.

Control signal manager 970 may transmit a control signal indicating one or more resources to be used for data communications and transmit a data communication using the one or more resources.

Figure 10:
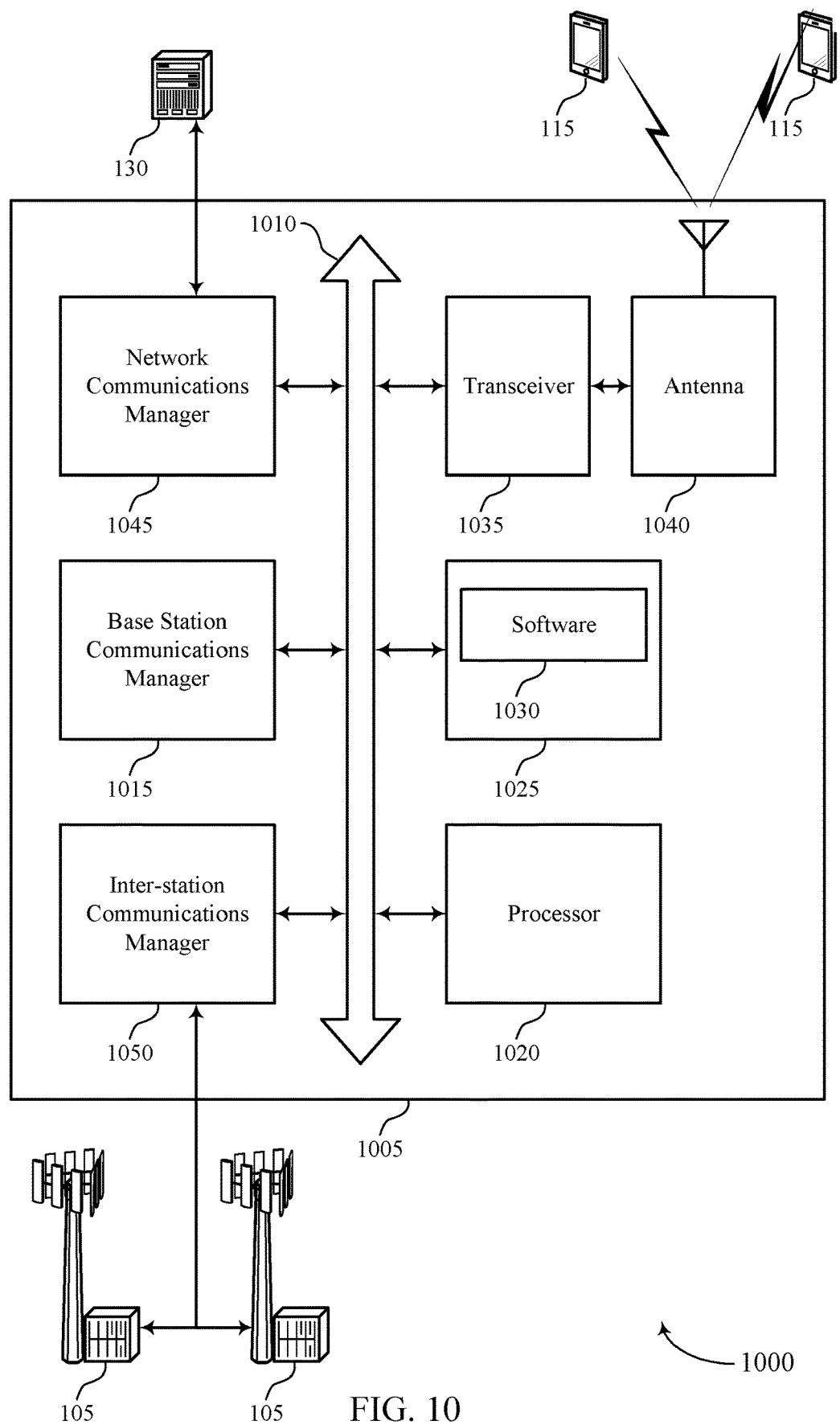
FIG. 10 illustrates a block diagram of a system including a base station that supports asynchronous single beam directional LBT in accordance with aspects of the present disclosure.

FIG. 10 shows a diagram of a system 1000 including a device 1005 that supports asynchronous single beam directional LBT in accordance with aspects of the present disclosure. Device 1005 may be an example of or include the components of wireless device 705, wireless device 805, or a base station 105 as described above, for example, with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting asynchronous single beam directional LBT).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support asynchronous single beam directional LBT. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
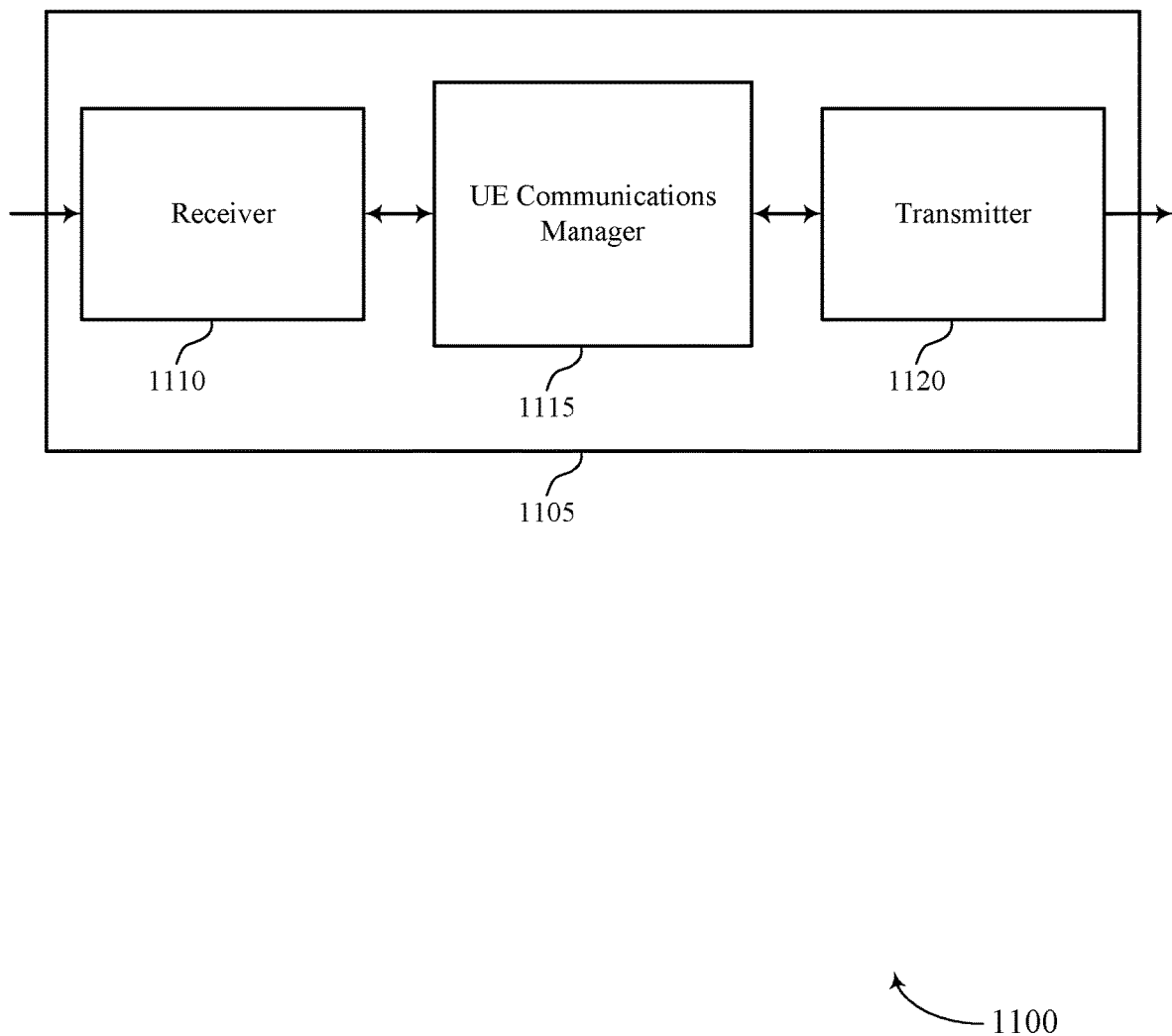
FIGS. 11 through 13 show block diagrams of a device that supports asynchronous single beam directional LBT in accordance with aspects of the present disclosure.

FIG. 11 shows a block diagram 1100 of a wireless device 1105 that supports asynchronous single beam directional LBT in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to asynchronous single beam directional LBT). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive, from a base station, an indication of a time period during which UE is to monitor a shared radio frequency spectrum band for one or more of a reservation request message, a reservation response message, or a preamble message from the base station, monitor the shared radio frequency spectrum band during the time period to receive at least one of the reservation request message, the reservation response message, or the preamble message from the base station, and receive downlink data from the base station based on the received reservation request message, reservation response message, or preamble message from the base station. The UE communications manager 1115 may also receive an RRQ for a transmission opportunity from a base station over a shared radio frequency spectrum band, transmit a reservation response message (RRS) to the base station over the shared radio frequency spectrum band in response to the RRQ, identify a beam configuration based on an inter-frame spacing between a downlink portion of the transmission opportunity and an uplink opportunity of the transmission opportunity, and perform a channel access procedure using the second beam configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
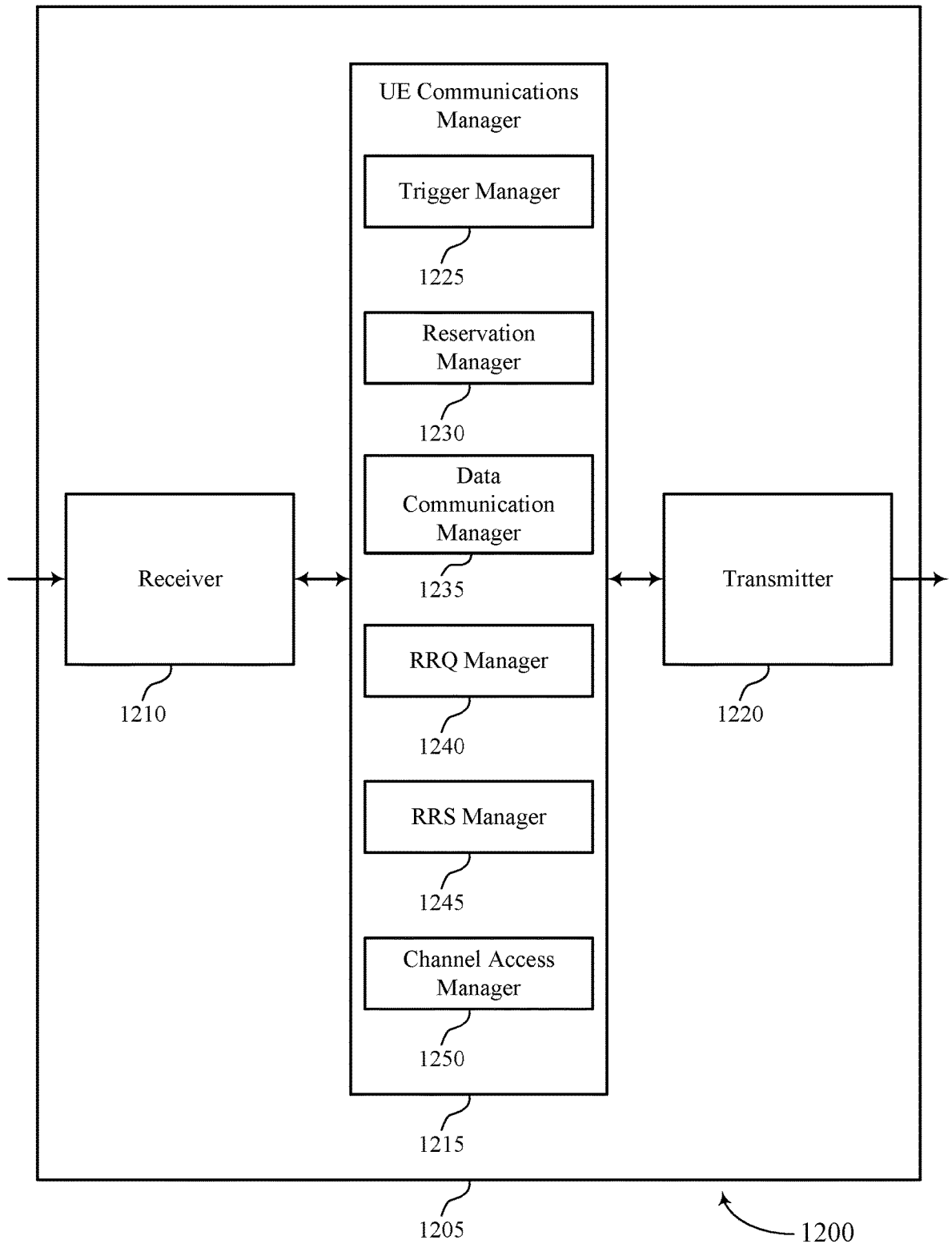

FIG. 12 shows a block diagram 1200 of a wireless device 1205 that supports asynchronous single beam directional LBT in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to asynchronous single beam directional LBT). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14.

UE communications manager 1215 may also include trigger manager 1225, reservation manager 1230, data communication manager 1235, RRQ manager 1240, RRS manager 1245, and channel access manager 1250.

Trigger manager 1225 may receive, from a base station, an indication of a time period during which UE is to monitor a shared radio frequency spectrum band for one or more of a reservation request message, a reservation response message, or a preamble message from the base station and select an energy or preamble detection threshold for the monitoring based on a non-continuous monitoring configuration of the UE.

Reservation manager 1230 may monitor the shared radio frequency spectrum band during the time period to receive at least one of the reservation request message, the reservation response message, or the preamble message from the base station.

Data communication manager 1235 may receive downlink data from the base station based on the received reservation request message, reservation response message, or preamble message from the base station and identify a beam configuration based on an inter-frame spacing between a downlink portion of the transmission opportunity and an uplink opportunity of the transmission opportunity.

RRQ manager 1240 may receive an RRQ for a transmission opportunity from a base station over a shared radio frequency spectrum band.

RRS manager 1245 may transmit an RRS to the base station over the shared radio frequency spectrum band in response to the RRQ.

Channel access manager 1250 may perform a channel access procedure using the second beam configuration.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
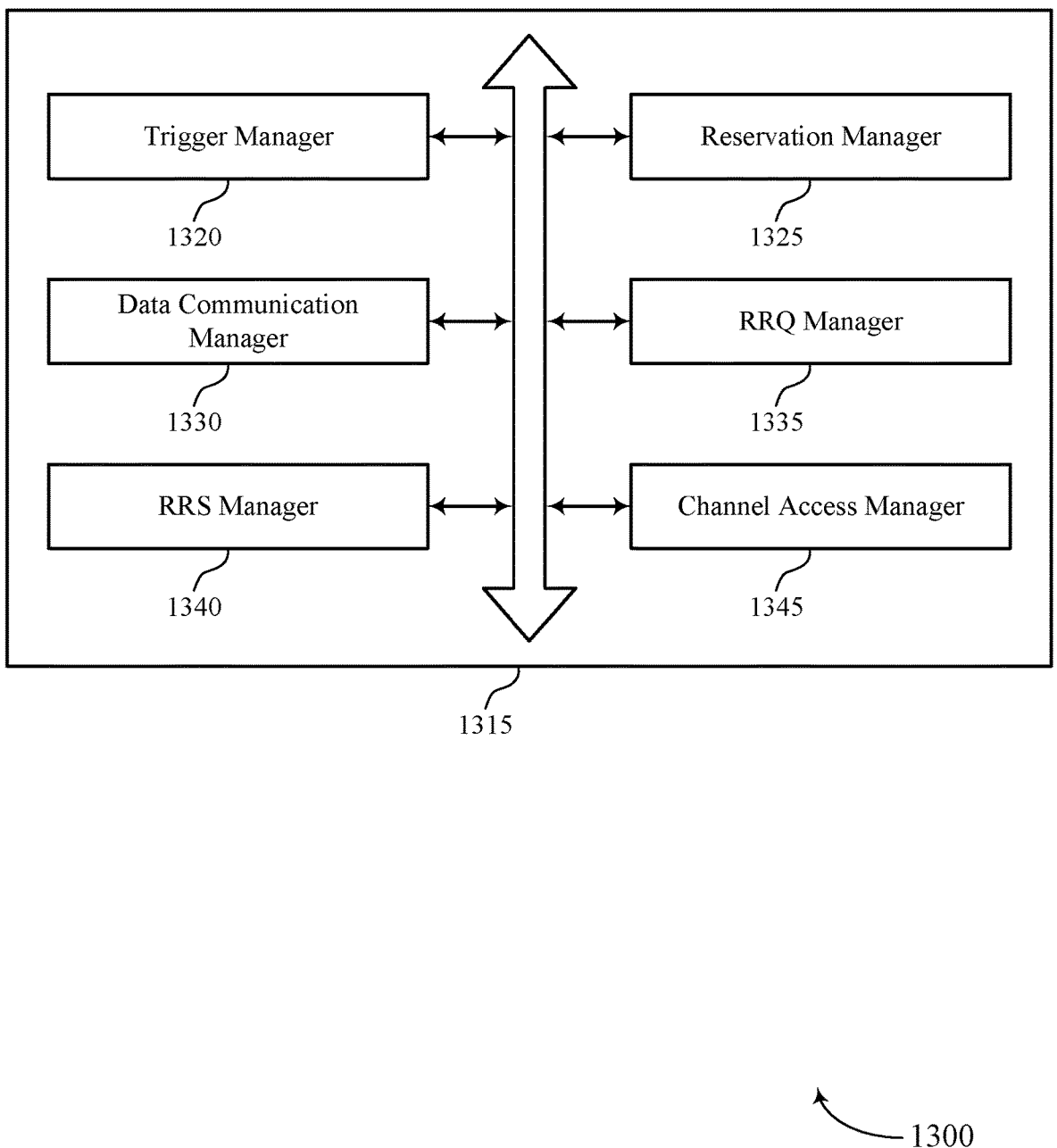

FIG. 13 shows a block diagram 1300 of a UE communications manager 1315 that supports asynchronous single beam directional LBT in accordance with aspects of the present disclosure. The UE communications manager 1315 may be an example of aspects of a UE communications manager 1415 described with reference to FIGS. 11, 12, and 14. The UE communications manager 1315 may include trigger manager 1320, reservation manager 1325, data communication manager 1330, RRQ manager 1335, RRS manager 1340, and channel access manager 1345. Each of these modules may communicate, directly or indirectly, with one another (e.g., via one or more buses).

Trigger manager 1320 may receive, from a base station, an indication of a time period during which UE is to monitor a shared radio frequency spectrum band for one or more of a reservation request message, a reservation response message, or a preamble message from the base station and select an energy or preamble detection threshold for the monitoring based on a non-continuous monitoring configuration of the UE.

Reservation manager 1325 may monitor the shared radio frequency spectrum band during the time period to receive at least one of the reservation request message, the reservation response message, or the preamble message from the base station.

Data communication manager 1330 may receive downlink data from the base station based on the received reservation request message, reservation response message, or preamble message from the base station and identify a beam configuration based on an inter-frame spacing between a downlink portion of the transmission opportunity and an uplink opportunity of the transmission opportunity.

RRQ manager 1335 may receive an RRQ for a transmission opportunity from a base station over a shared radio frequency spectrum band.

RRS manager 1340 may transmit an RRS to the base station over the shared radio frequency spectrum band in response to the RRQ.

Channel access manager 1345 may perform a channel access procedure using the second beam configuration.

Figure 14:
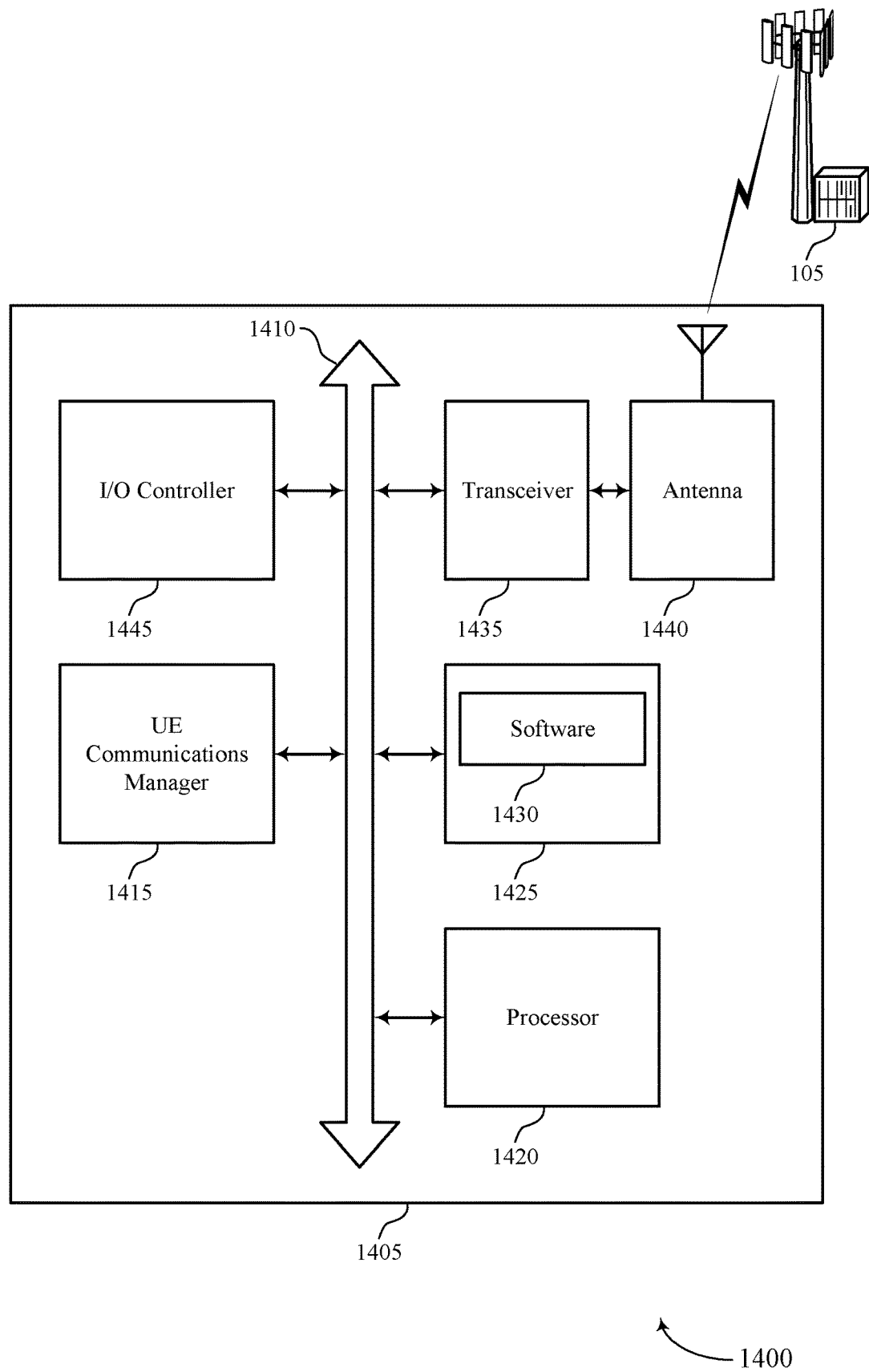
FIG. 14 illustrates a block diagram of a system including a UE that supports asynchronous single beam directional LBT in accordance with aspects of the present disclosure.

FIG. 14 shows a diagram of a system 1400 including a device 1405 that supports asynchronous single beam directional LBT in accordance with aspects of the present disclosure. Device 1405 may be an example of or include the components of UE 115 as described above, for example, with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting asynchronous single beam directional LBT).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support asynchronous single beam directional LBT. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
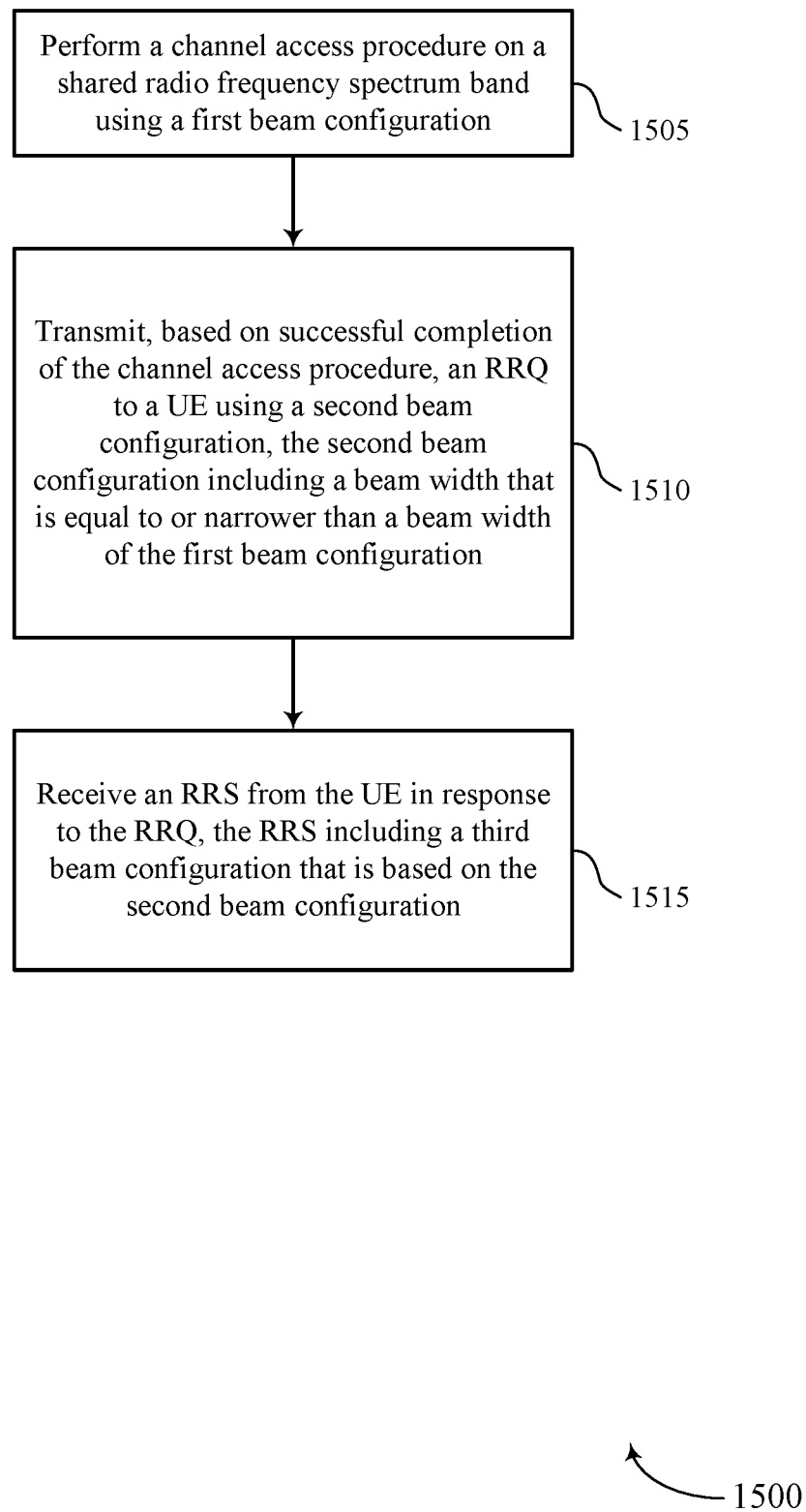
FIGS. 15 through 21 illustrate methods for asynchronous single beam directional LBT in accordance with aspects of the present disclosure.

FIG. 15 shows a flowchart illustrating a method 1500 for asynchronous single beam directional LBT in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may perform a channel access procedure on a shared radio frequency spectrum band using a first beam configuration. The operations of 1505 may be performed according to the methods described herein. In certain examples, aspects of the operations of 1505 may be performed by a channel access manager as described with reference to FIGS. 7 through 10.

At 1510 the base station 105 may transmit, based at least in part on successful completion of the channel access procedure, an RRQ to a UE using a second beam configuration, the second beam configuration comprising a beam width that is equal to or narrower than a beam width of the first beam configuration. The operations of 1510 may be performed according to the methods described herein. In certain examples, aspects of the operations of 1510 may be performed by an RRQ manager as described with reference to FIGS. 7 through 10.

At 1515 the base station 105 may receive an RRS from the UE in response to the RRQ, the RRS comprising a third beam configuration that is based at least in part on the second beam configuration. The operations of 1515 may be performed according to the methods described herein. In certain examples, aspects of the operations of 1515 may be performed by an RRS manager as described with reference to FIGS. 7 through 10.

Figure 16:
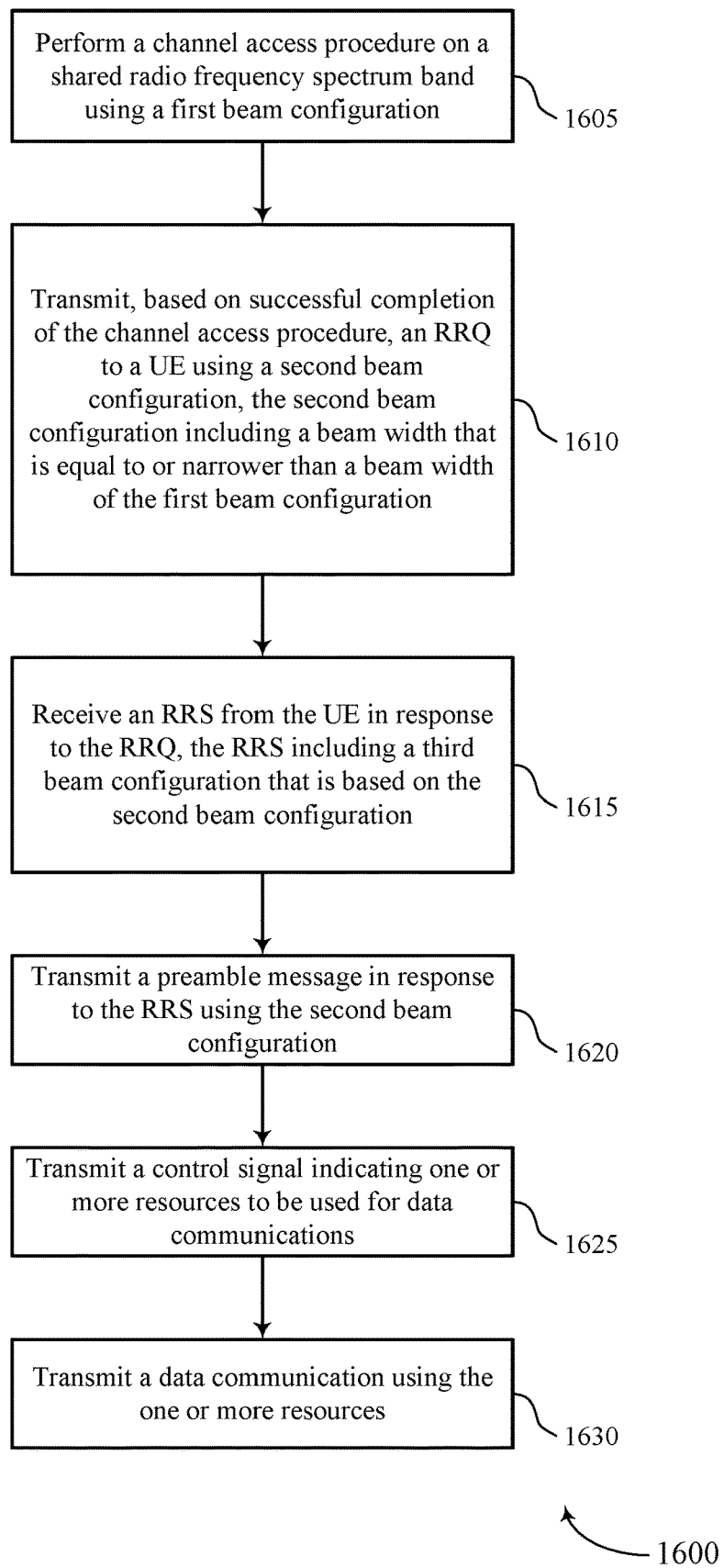

FIG. 16 shows a flowchart illustrating a method 1600 for asynchronous single beam directional LBT in accordance with aspects of the present disclosure. The operations of method 1600 may be implemented by a base station 105 or its components as described herein. For example, the operations of method 1600 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may perform a channel access procedure on a shared radio frequency spectrum band using a first beam configuration. The operations of 1605 may be performed according to the methods described herein. In certain examples, aspects of the operations of 1605 may be performed by a channel access manager as described with reference to FIGS. 7 through 10.

At 1610 the base station 105 may transmit, based at least in part on successful completion of the channel access procedure, an RRQ to a UE using a second beam configuration, the second beam configuration comprising a beam width that is equal to or narrower than a beam width of the first beam configuration. The operations of 1610 may be performed according to the methods described herein. In certain examples, aspects of the operations of 1610 may be performed by an RRQ manager as described with reference to FIGS. 7 through 10.

At 1615 the base station 105 may receive an RRS from the UE in response to the RRQ, the RRS comprising a third beam configuration that is based at least in part on the second beam configuration. The operations of 1615 may be performed according to the methods described herein. In certain examples, aspects of the operations of 1615 may be performed by an RRS manager as described with reference to FIGS. 7 through 10.

At 1620 the base station 105 may transmit a preamble message in response to the RRS using the second beam configuration. The operations of 1620 may be performed according to the methods described herein. In certain examples, aspects of the operations of 1620 may be performed by a preamble manager as described with reference to FIGS. 7 through 10.

At 1625 the base station 105 may transmit a control signal indicating one or more resources to be used for data communications. The operations of 1625 may be performed according to the methods described herein. In certain examples, aspects of the operations of 1625 may be performed by a preamble manager as described with reference to FIGS. 7 through 10.

At 1630 the base station 105 may transmit a data communication using the one or more resources. The operations of 1630 may be performed according to the methods described herein. In certain examples, aspects of the operations of 1630 may be performed by a preamble manager as described with reference to FIGS. 7 through 10.

Figure 17:
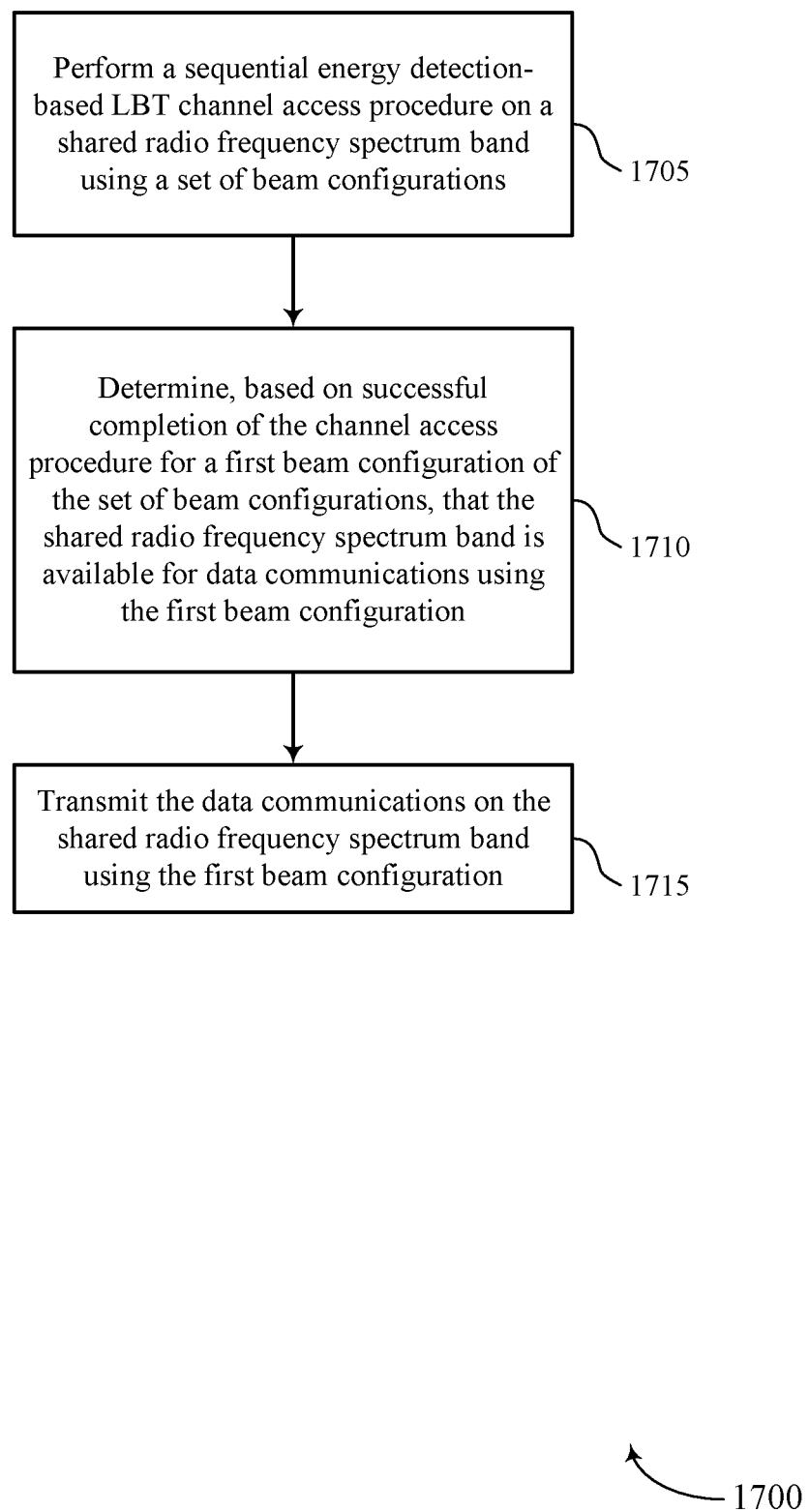

FIG. 17 shows a flowchart illustrating a method 1700 for asynchronous single beam directional LBT in accordance with aspects of the present disclosure. The operations of method 1700 may be implemented by a base station 105 or its components as described herein. For example, the operations of method 1700 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may perform a sequential energy detection-based LBT channel access procedure on a shared radio frequency spectrum band using a plurality of beam configurations. The operations of 1705 may be performed according to the methods described herein. In certain examples, aspects of the operations of 1705 may be performed by a channel access manager as described with reference to FIGS. 7 through 10.

At 1710 the base station 105 may determine, based at least in part on successful completion of the channel access procedure for a first beam configuration of the plurality of beam configurations, that the shared radio frequency spectrum band is available for data communications using the first beam configuration. The operations of 1710 may be performed according to the methods described herein. In certain examples, aspects of the operations of 1710 may be performed by a channel access manager as described with reference to FIGS. 7 through 10.

At 1715 the base station 105 may transmit the data communications on the shared radio frequency spectrum band using the first beam configuration. The operations of 1715 may be performed according to the methods described herein. In certain examples, aspects of the operations of 1715 may be performed by a data communication manager as described with reference to FIGS. 7 through 10.

Figure 18:
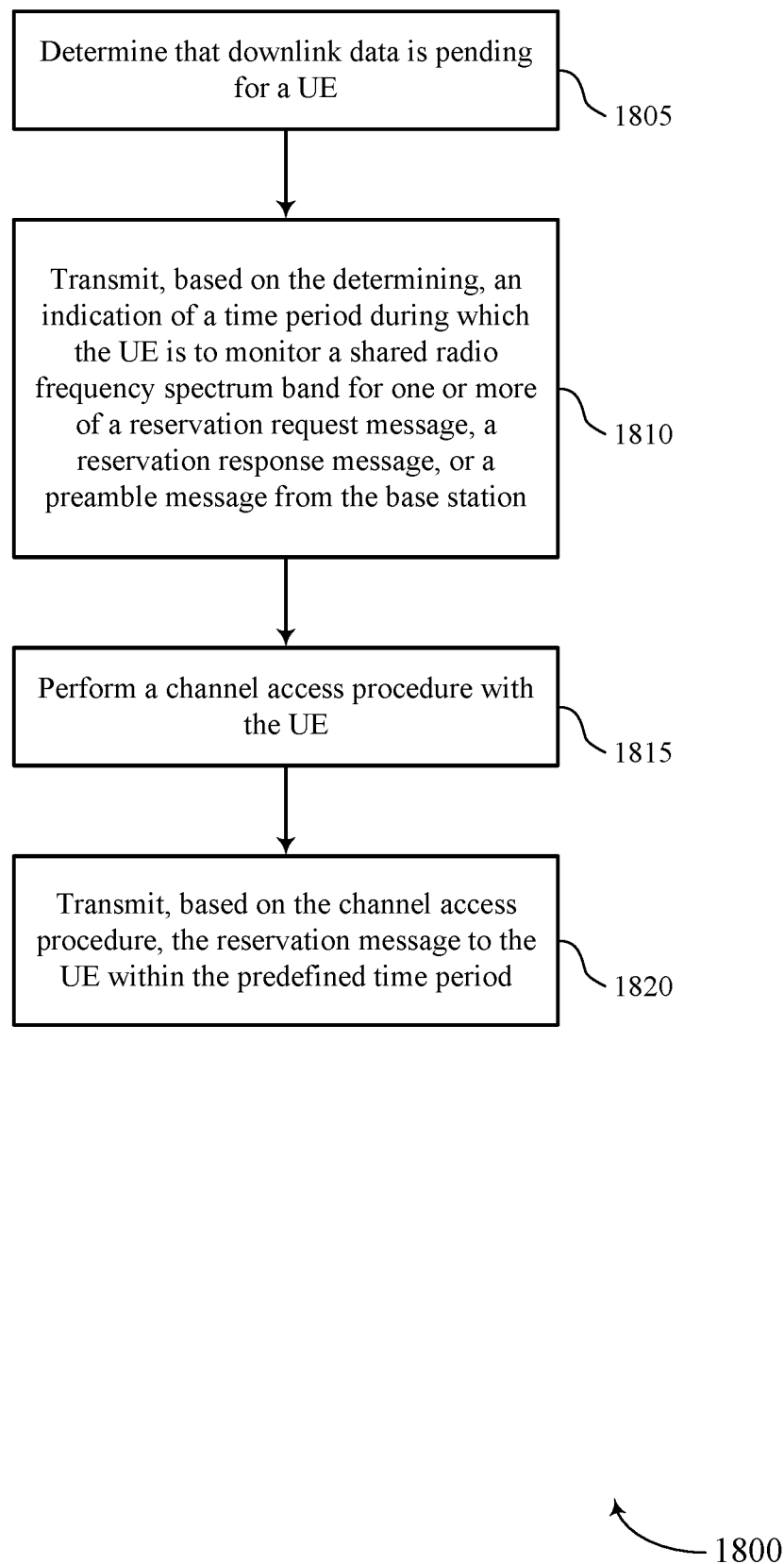

FIG. 18 shows a flowchart illustrating a method 1800 for asynchronous single beam directional LBT in accordance with aspects of the present disclosure. The operations of method 1800 may be implemented by a base station 105 or its components as described herein. For example, the operations of method 1800 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may determine that downlink data is pending for a UE. The operations of 1805 may be performed according to the methods described herein. In certain examples, aspects of the operations of 1805 may be performed by a data communication manager as described with reference to FIGS. 7 through 10.

At 1810 the base station 105 may transmit, based at least in part on the determining, an indication of a time period during which the UE is to monitor a shared radio frequency spectrum band for one or more of a reservation request message, a reservation response message, or a preamble message from the base station. The operations of 1810 may be performed according to the methods described herein. In certain examples, aspects of the operations of 1810 may be performed by a trigger manager as described with reference to FIGS. 7 through 10.

At 1815 the base station 105 may perform a channel access procedure with the UE. The operations of 1815 may be performed according to the methods described herein. In certain examples, aspects of the operations of 1815 may be performed by a channel access manager as described with reference to FIGS. 7 through 10.

At 1820 the base station 105 may transmit, based at least in part on the channel access procedure, the reservation message to the UE within the predefined time period. The operations of 1820 may be performed according to the methods described herein. In certain examples, aspects of the operations of 1820 may be performed by a data communication manager as described with reference to FIGS. 7 through 10.

Figure 19:
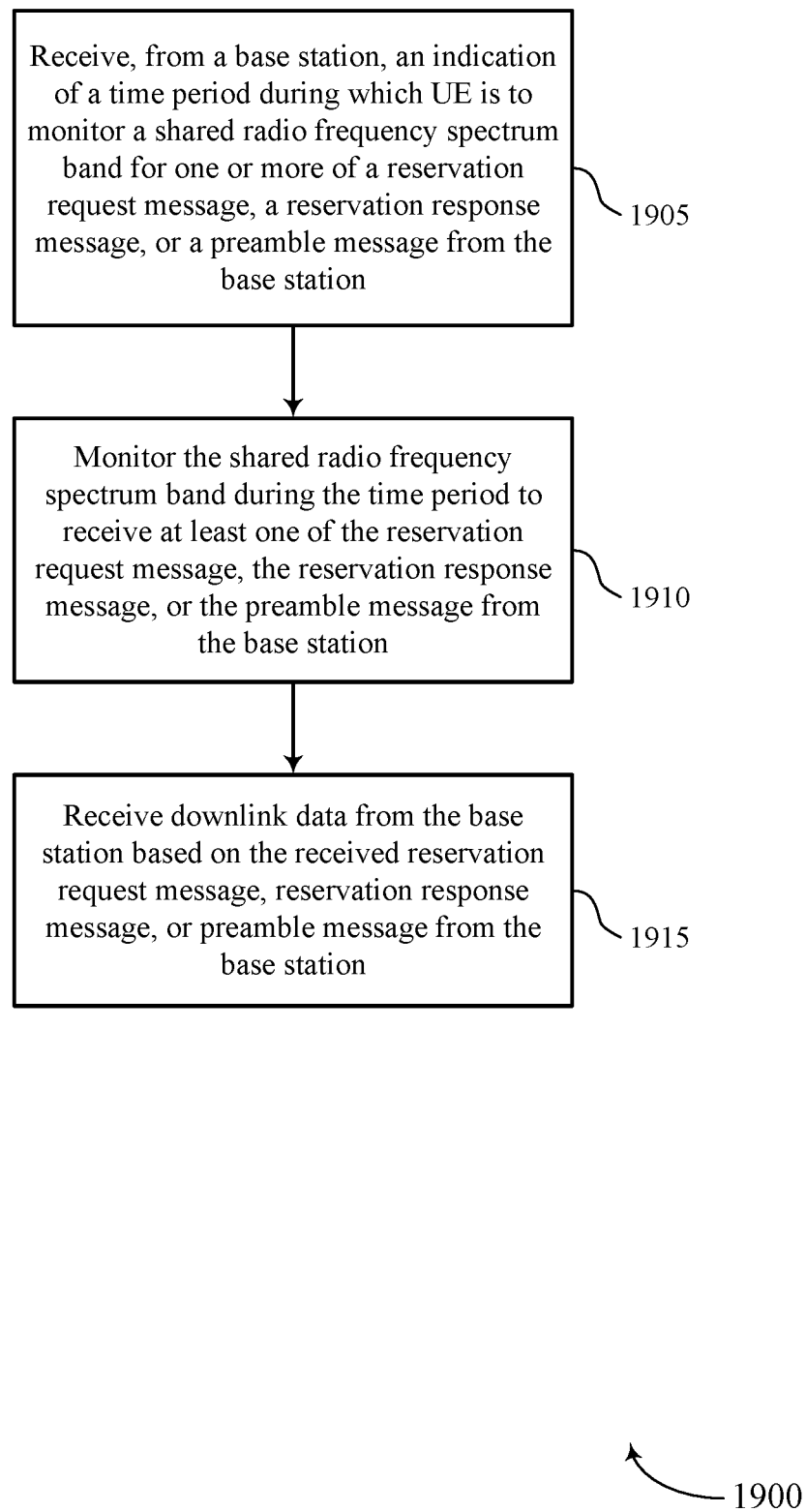

FIG. 19 shows a flowchart illustrating a method 1900 for asynchronous single beam directional LBT in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive, from a base station, an indication of a time period during which UE is to monitor a shared radio frequency spectrum band for one or more of a reservation request message, a reservation response message, or a preamble message from the base station. The operations of 1905 may be performed according to the methods described herein. In certain examples, aspects of the operations of 1905 may be performed by a trigger manager as described with reference to FIGS. 11 through 14.

At 1910 the UE 115 may monitor the shared radio frequency spectrum band during the time period to receive at least one of the reservation request message, the reservation response message, or the preamble message from the base station. The operations of 1910 may be performed according to the methods described herein. In certain examples, aspects of the operations of 1910 may be performed by a reservation manager as described with reference to FIGS. 11 through 14.

At 1915 the UE 115 may receive downlink data from the base station based at least in part on the received reservation request message, reservation response message, or preamble message from the base station. The operations of 1915 may be performed according to the methods described herein. In certain examples, aspects of the operations of 1915 may be performed by a data communication manager as described with reference to FIGS. 11 through 14.

Figure 20:
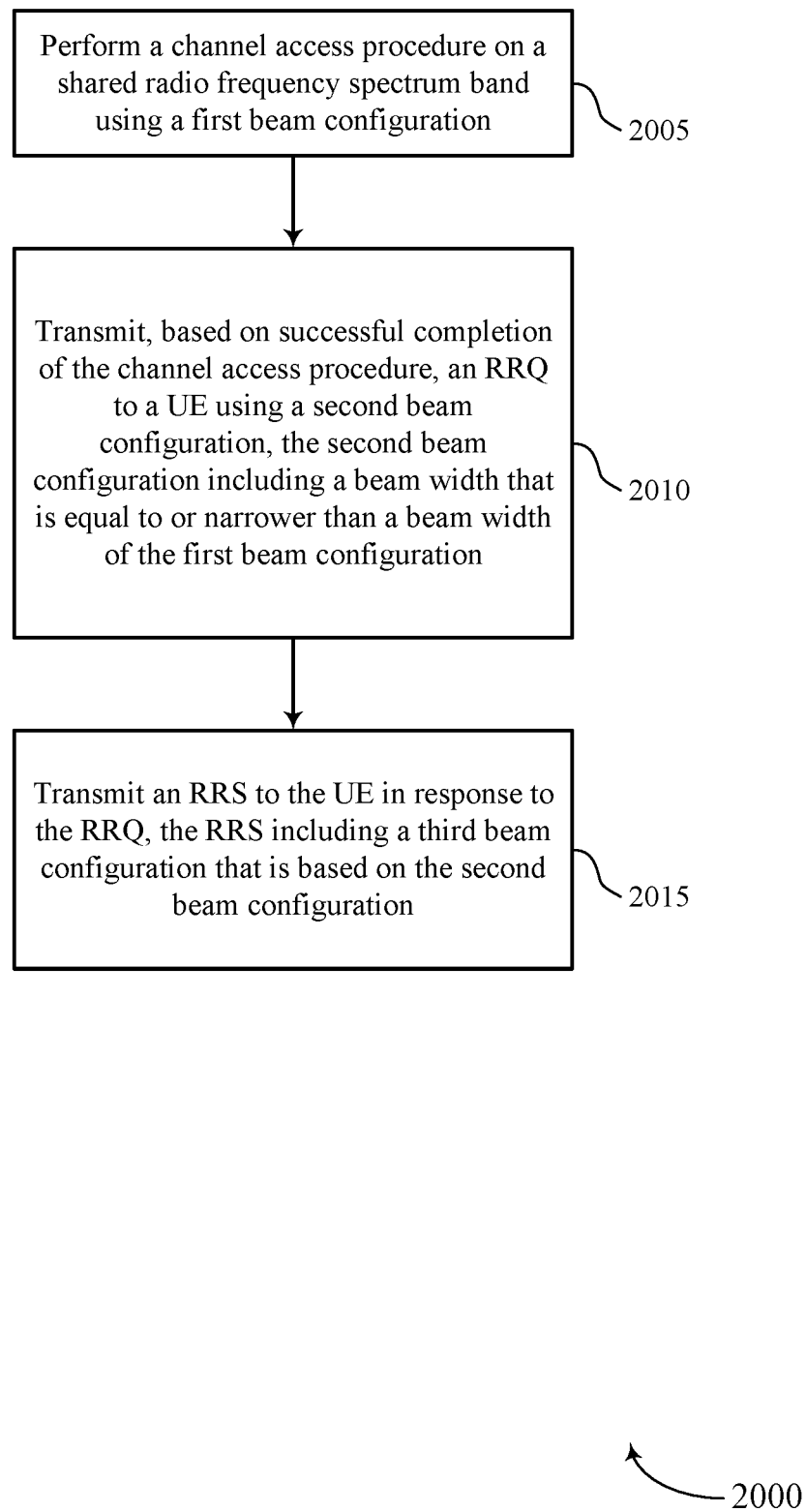

FIG. 20 shows a flowchart illustrating a method 2000 for asynchronous single beam directional LBT in accordance with aspects of the present disclosure. The operations of method 2000 may be implemented by a base station 105 or its components as described herein. For example, the operations of method 2000 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may perform a channel access procedure on a shared radio frequency spectrum band using a first beam configuration. The operations of 2005 may be performed according to the methods described herein. In certain examples, aspects of the operations of 2005 may be performed by a channel access manager as described with reference to FIGS. 7 through 10.

At 2010 the base station 105 may transmit, based at least in part on successful completion of the channel access procedure, an RRQ to a UE using a second beam configuration, the second beam configuration comprising a beam width that is equal to or narrower than a beam width of the first beam configuration. The operations of 2010 may be performed according to the methods described herein. In certain examples, aspects of the operations of 2010 may be performed by an RRQ manager as described with reference to FIGS. 7 through 10.

At 2015 the base station 105 may transmit an RRS to the UE in response to the RRQ, the RRS comprising a third beam configuration that is based at least in part on the second beam configuration. The operations of 2015 may be performed according to the methods described herein. In certain examples, aspects of the operations of 2015 may be performed by an RRS manager as described with reference to FIGS. 7 through 10.

Figure 21:
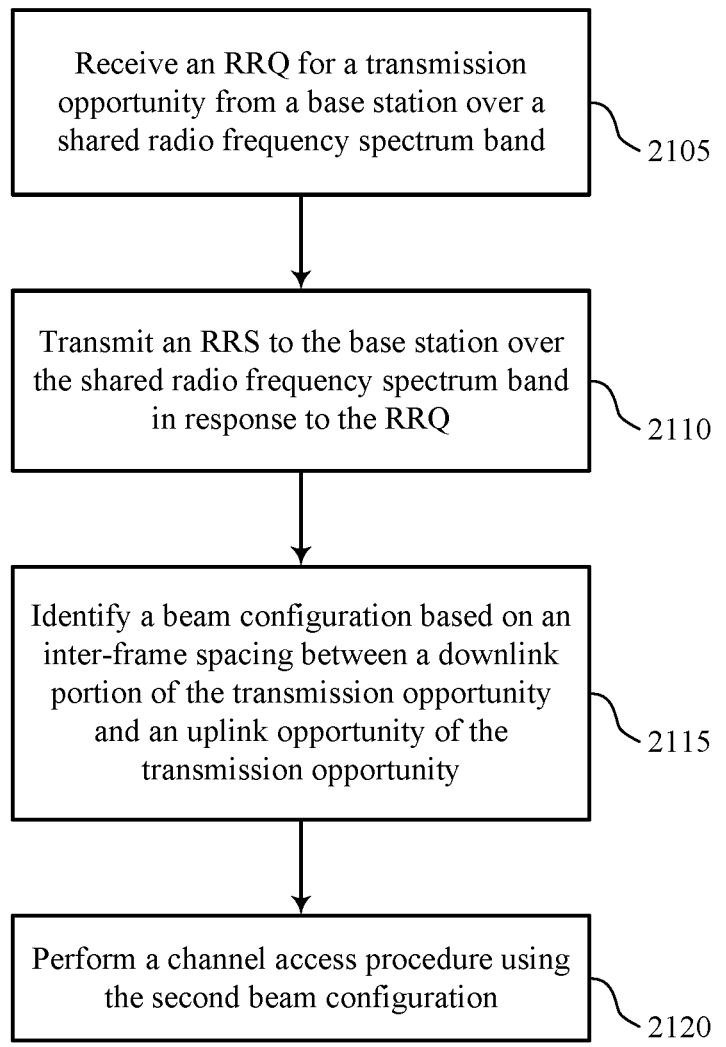

FIG. 21 shows a flowchart illustrating a method 2100 for asynchronous single beam directional LBT in accordance with aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive an RRQ for a transmission opportunity from a base station over a shared radio frequency spectrum band. The operations of 2105 may be performed according to the methods described herein. In certain examples, aspects of the operations of 2105 may be performed by an RRQ manager as described with reference to FIGS. 11 through 14.

At 2110 the UE 115 may transmit an RRS to the base station over the shared radio frequency spectrum band in response to the RRQ. The operations of 2110 may be performed according to the methods described herein. In certain examples, aspects of the operations of 2110 may be performed by an RRS manager as described with reference to FIGS. 11 through 14.

At 2115 the UE 115 may identify a beam configuration based at least in part on an inter-frame spacing between a downlink portion of the transmission opportunity and an uplink opportunity of the transmission opportunity. The operations of 2115 may be performed according to the methods described herein. In certain examples, aspects of the operations of 2115 may be performed by a data communication manager as described with reference to FIGS. 11 through 14.

At 2120 the UE 115 may perform a channel access procedure using the second beam configuration. The operations of 2120 may be performed according to the methods described herein. In certain examples, aspects of the operations of 2120 may be performed by a channel access manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    performing a channel access procedure on a shared radio frequency spectrum band using a first beam configuration;
    selecting, from the first beam configuration and a second beam configuration comprising a beam width that is narrower than a beam width of the first beam configuration, a beam configuration for transmitting a reservation request message (RRQ) based at least in part on successful completion of the channel access procedure;
    transmitting the RRQ to a user equipment (UE) using the selected beam configuration; and
    receiving a reservation response message (RRS) from the UE in response to the RRQ, the RRS comprising a third beam configuration that is based at least in part on the selected beam configuration.

2. The method of claim 1, further comprising:
    transmitting a preamble message in response to the RRS using the second beam configuration;
    transmitting a control signal indicating one or more resources to be used for data communications; and
    transmitting a data communication using the one or more resources.

3. The method of claim 1, further comprising:
    determining that downlink data is available for a plurality of UEs; and
    performing, based at least in part on the determination, a sequence of channel access procedures over a plurality of corresponding beam directions using the first beam configuration.

4. The method of claim 3, wherein performing the sequence of channel access procedures comprises, for beam direction:
    detecting an energy level in each direction over a predetermined number of contention slots, or
    monitoring for RRSs over the predetermined number of contention slots.

5. The method of claim 1, further comprising:
    selecting a first beam width for the first beam configuration; and
    selecting a second beam width for the second beam configuration.

6. The method of claim 5, further comprising:
    selecting an energy or preamble detection threshold for the channel access procedure based at least in part on a width of the first beam width.

7. The method of claim 5, further comprising:
    selecting an energy or preamble detection threshold for the channel access procedure based at least in part on a difference between the first beam width and the second beam width.

8. The method of claim 5, further comprising:
    selecting an energy or preamble detection threshold for the channel access procedure based at least in part on whether the first beam width comprises a P1 beam, a P2 beam, or a P3 beam.

9. The method of claim 1, further comprising:
    configuring each UE of a plurality of UEs for which downlink data is available with orthogonal resources for receiving the corresponding RRSs.

10. The method of claim 1, further comprising:
    configuring each UE of a plurality of UEs for which downlink data is available with overlapping resources for receiving the corresponding RRSs; and
    determining an energy or preamble detection threshold for detecting each corresponding RRS based at least in part on the third beam configuration.

11. The method of claim 1, wherein determining that the channel access procedure is successful comprises:
    determining that no RRQ or RRS are received from other devices during the channel access procedure.

12. The method of claim 1, wherein determining that the channel access procedure is successful comprises:
    determining that no active RRQ or RRS are received from other devices during the channel access procedure, wherein an active RRQ or RRS comprises detecting a corresponding preamble message transmitted in response to the RRQ or RRS.

13. The method of claim 1, further comprising:
    determining that an active RRQ or active RRS is received from other devices during the channel access procedure, wherein an active RRQ or active RRS comprises detecting a corresponding preamble message transmitted in response to the RRQ or RRS and within a fixed time period; and
    performing a backoff procedure based at least in part on one or more of the active RRQ, the active RRS, an RRQ or RRS of a second operator, or an RRQ or RRS of a first operator.

14. The method of claim 1, further comprising:
    configuring a preamble message in response to the RRS using the second beam configuration, wherein the preamble message confirms a reservation for uplink communications from the UE.

15. The method of claim 1, wherein the channel access procedure comprises at least one of an energy-based listen-before-talk (LBT) procedure or a preamble-based LBT procedure.

16. A method for wireless communication, comprising:
    performing a sequential energy detection-based listen-before-talk (LBT) channel access procedure on a shared radio frequency spectrum band using a plurality of beam configurations, wherein each beam configuration of the plurality of beam configurations comprises a different beam width;
    selecting a first beam width for a first beam configuration of the plurality of beam configurations;
    selecting a second beam width for a second beam configuration of the plurality of beam configurations, the second beam width being narrower than the first beam width;
    determining, based at least in part on successful completion of the channel access procedure for the first beam configuration or the second beam configuration, that the shared radio frequency spectrum band is available for data communications using the first beam configuration or the second beam configuration; and transmitting the data communications on the shared radio frequency spectrum band using the first beam configuration or the second beam configuration.

17. The method of claim 16, further comprising:
transmitting a control signal indicating one or more resources to be used for data communications; and
transmitting a data communication using the one or more resources.

18. The method of claim 16, further comprising:
determining that downlink data is available for a plurality of receiving devices; and
performing, based at least in part on the determination, a sequence of channel access procedures over a plurality of corresponding beam directions using the first beam configuration.

19. The method of claim 18, wherein performing the sequence of channel access procedures comprises, for beam direction:
detecting an energy level in each direction over a predetermined number of contention slots.

20. The method of claim 16, further comprising:
selecting an energy or preamble detection threshold for the channel access procedure based at least in part on a width of the first beam width.

21. The method of claim 16, further comprising:
selecting an energy or preamble detection threshold for the channel access procedure based at least in part on a difference between the first beam width and the second beam width.

22. The method of claim 16, further comprising:
selecting an energy or preamble detection threshold for the channel access procedure based at least in part on whether the first beam width comprises a P1 beam, a P2 beam, or a P3 beam.

23. An apparatus for wireless communication, comprising:
a processor;
memory in electronic communication with the processor; and
instructions stored in the memory and executable by the processor to cause the apparatus to:
perform a channel access procedure on a shared radio frequency spectrum band using a first beam configuration;
select, from the first beam configuration and a second beam configuration comprising a beam width that is narrower than a beam width of the first beam configuration, a beam configuration for transmitting a reservation request message (RRQ) based at least in part on successful completion of the channel access procedure;
transmit the RRQ to a user equipment (UE) using the selected beam configuration; and
receive a reservation response message (RRS) from the UE in response to the RRQ, the RRS comprising a third beam configuration that is based at least in part on the selected beam configuration.

24. The apparatus of claim 23, wherein the instructions are further executable by the processor to cause the apparatus to:
transmit a preamble message in response to the RRS using the second beam configuration;
transmit a control signal indicating one or more resources to be used for data communications; and
transmit a data communication using the one or more resources.

25. The apparatus of claim 23, wherein the instructions are further executable by the processor to cause the apparatus to:
determine that downlink data is available for a plurality of UEs; and
perform, based at least in part on the determination, a sequence of channel access procedures over a plurality of corresponding beam directions using the first beam configuration.

26. An apparatus for wireless communication, comprising:
a processor;
memory in electronic communication with the processor; and
instructions stored in the memory and executable by the processor to cause the apparatus to:
perform a sequential energy detection-based listen-before-talk (LBT) channel access procedure on a shared radio frequency spectrum band using a plurality of beam configurations, wherein each beam configuration of the plurality of beam configurations comprises a different beam width;
select a first beam width for a first beam configuration of the plurality of beam configurations;
select a second beam width for a second beam configuration of the plurality of beam configurations, the second beam width being narrower than the first beam width;
determine, based at least in part on successful completion of the channel access procedure for the first beam configuration or the second beam configuration, that the shared radio frequency spectrum band is available for data communications using the first beam configuration or the second beam configuration; and
transmit the data communications on the shared radio frequency spectrum band using the first beam configuration or the second beam configuration.

27. The apparatus of claim 26, wherein the instructions are further executable by the processor to cause the apparatus to:
transmit a control signal indicating one or more resources to be used for data communications; and
transmit a data communication using the one or more resources.

* * * * *